United States Patent
Okamoto et al.

(10) Patent No.: US 7,774,281 B2
(45) Date of Patent: Aug. 10, 2010

(54) INFORMATION CONTENTS DOWNLOAD SYSTEM

(75) Inventors: Minoru Okamoto, Osaka (JP); Katsuhiko Ueda, Osaka (JP); Shirou Yoshioka, Hyogo (JP); Tetsuji Kishi, Osaka (JP)

(73) Assignee: Panasonic Corporation, Osaka (JP)

( * ) Notice: Subject to any disclaimer, the term of this patent is extended or adjusted under 35 U.S.C. 154(b) by 1195 days.

(21) Appl. No.: 11/152,085

(22) Filed: Jun. 15, 2005

(65) Prior Publication Data

US 2006/0021025 A1     Jan. 26, 2006

(30) Foreign Application Priority Data

Jun. 21, 2004    (JP) ............................. P2004-182540

(51) Int. Cl.
*G06F 21/00* (2006.01)
(52) U.S. Cl. ........................ 705/59; 705/51; 713/201; 726/26
(58) Field of Classification Search .................... 705/59, 705/51; 713/201; 726/26
See application file for complete search history.

(56) References Cited

U.S. PATENT DOCUMENTS

| 6,026,366 | A | 2/2000 | Grube | |
| 6,226,618 | B1 * | 5/2001 | Downs et al. | 705/1.1 |
| 6,912,512 | B2 * | 6/2005 | Miyazaki et al. | 705/51 |
| 2003/0004888 | A1 * | 1/2003 | Kambayashi et al. | 705/59 |
| 2003/0140009 | A1 * | 7/2003 | Namba et al. | 705/59 |
| 2004/0015730 | A1 * | 1/2004 | Arai et al. | 713/201 |

FOREIGN PATENT DOCUMENTS

| JP | 10-011043 | 1/1998 |
| JP | 2002-109254 | 4/2002 |
| JP | 2002-259844 | 9/2002 |
| JP | 2002-323980 | 11/2002 |
| JP | 2003-186851 | 7/2003 |
| JP | 2003-346002 | 12/2003 |

\* cited by examiner

*Primary Examiner*—Pierre E Elisca
*Assistant Examiner*—Shahid Kamal
(74) *Attorney, Agent, or Firm*—McDermott Will & Emery LLP

(57) ABSTRACT

A terminal device transmits device information thereof and a request for acquiring information contents to a contents distribution device. The contents distribution device generates a request for distributing a program for materializing the information contents in the terminal device based on the information contents designated in the acquisition request and the device information, and transmits a license request for using a function standard required for realizing the function to a license management device. The license management device receives the usage license request and correspondingly transmits an authorization for using the function standard to the program distribution device and the contents distribution device. The program distribution device transmits the program to the terminal device only when the usage authorization is received. The contents distribution device transmits the information contents to the terminal device only when the usage authorization is received.

10 Claims, 20 Drawing Sheets

F I G. 2
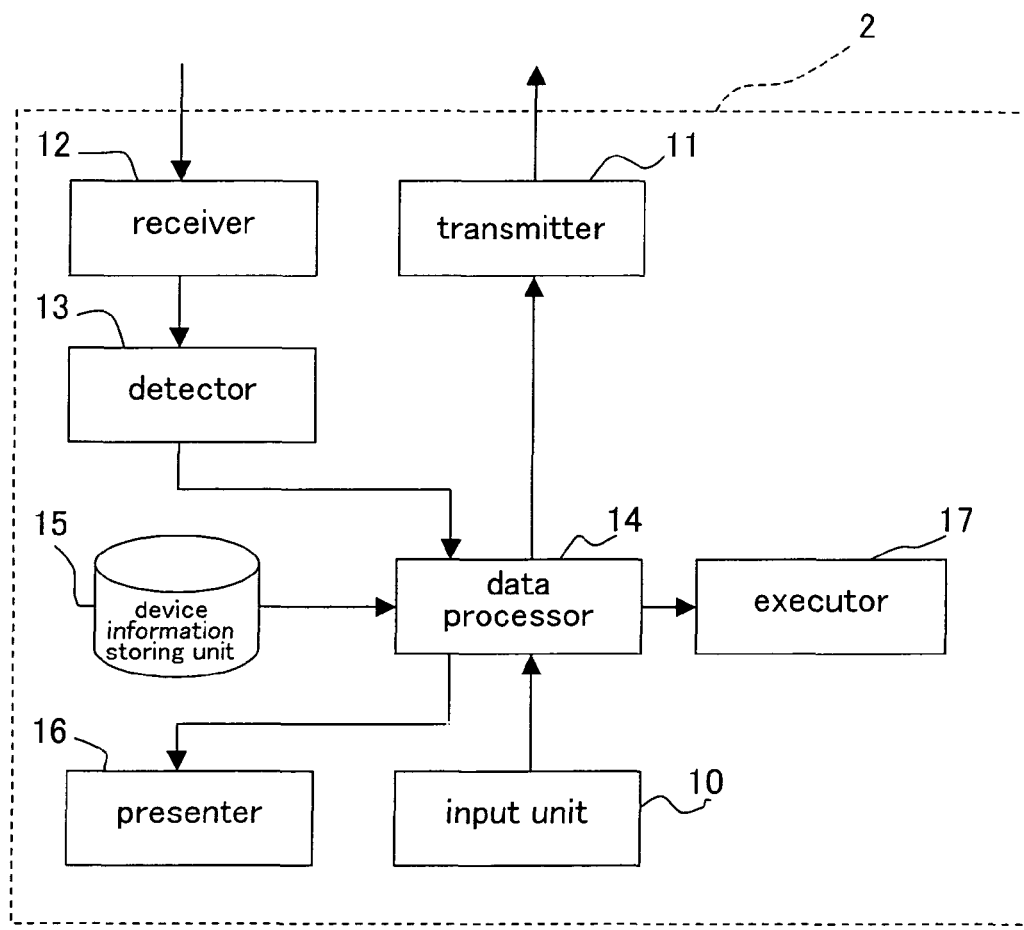

F I G. 1 9
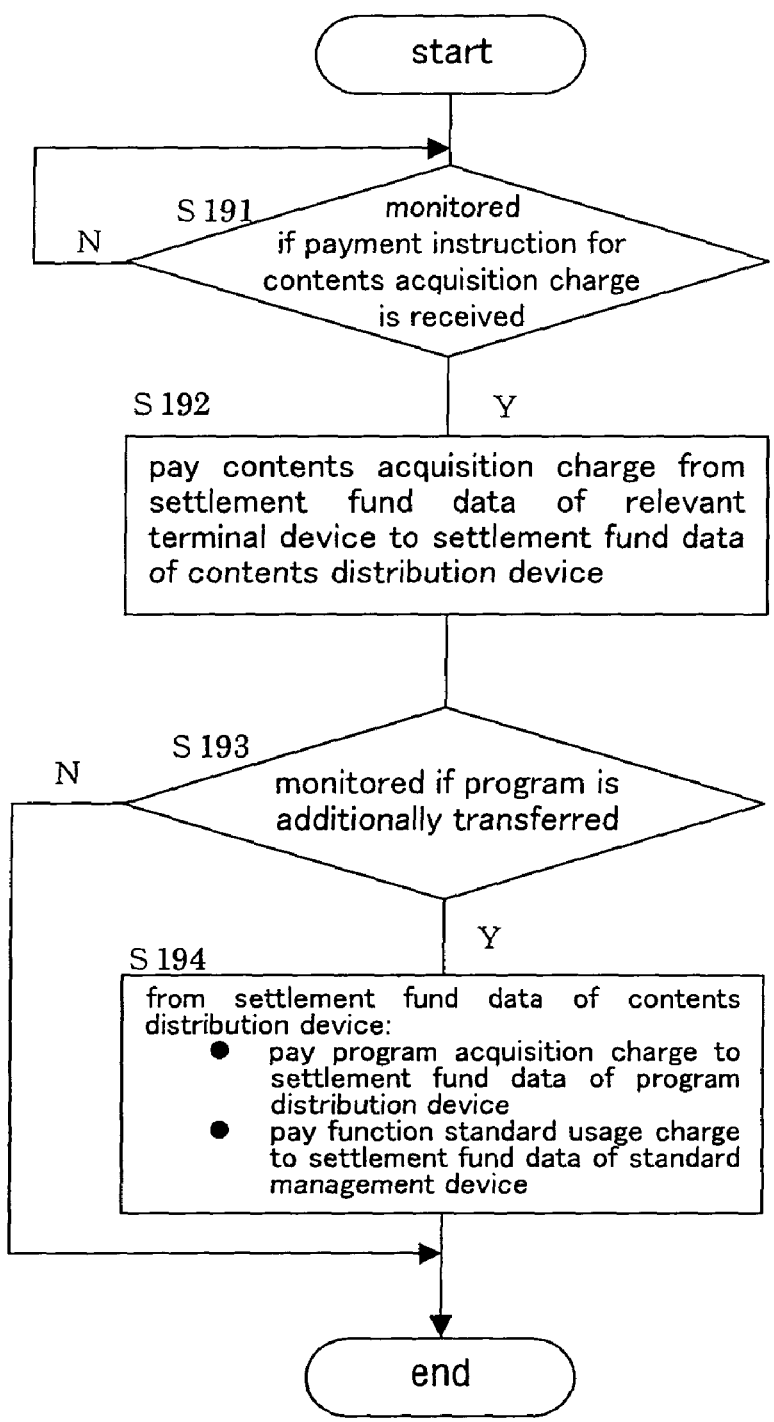

INFORMATION CONTENTS DOWNLOAD SYSTEM

BACKGROUND OF THE INVENTION

1. Field of the Invention

The present invention relates to a configuration for downloading information contents and a program used for materializing the information contents and a processing system for any charge generated in the download.

2. Description of the Related Arts

An advancement of a broadband communication technology in recent years has been facilitating the transmission/reception of information contents of various types (image, music and the like), whose too a large information volume had always been a bottleneck in a communication process. Further, it is now being realized to materialize all of required functions on software using a terminal device in response to an increasingly higher performance achieved in LSI. For example, when image data of MPEG4, which cannot be reproduced when the terminal device is in an initial state, can be reproduced by acquiring a reproduction function (reproduction program) of the MPEG4 in a download process or the like via the internet and installing the function in the terminal device. A part of such an extensible and flexible function-adding configuration is increasingly materialized in the reconfigurable DSP (Digital Signal Processor) and the like. As an example of a conventional technology relating to the present invention can be mentioned an invention relating to a method of distributing software to a terminal recited in U.S. Pat. No. 6,026,366 A of the Publication of the U.S. Patents.

In the function, which is thus optionally addable, various function standards are set in order to realize the function further, it is necessary to obtain a usage license from a management organization in charge of managing the distribution of the function standards in order to realize the function in the terminal device in the case of some of the functions having the function standards. To be specific, the usage license is obtained as a result of paying a usage charge to the management organization.

As the extensibility and flexibility in acquiring the functions are more enhanced, there is a strong demand for building a communication management system for handling transactions of acquiring the information contents and functions. Some functions subjected to the acquisition transactions are obtained based on a license obtained from a third party. For example, there is a license management organization which handles a license for the MPEG4 method used for compression and decoding of a moving image or the like, and an obligation to pay a license fee to them is generated even when a constitution for realizing the function (recording, reproduction and the like) is installed in the terminal device (instrument). If such a function is not installed in the terminal device in a shipment stage, it is a key issue how the license management (management of usage license) should be handled. It is important to carry out the license management because it becomes necessary to include the license fee in a currently available payment method, that is a sales price of the terminal device, if the management of the usage license is not handled in a proper manner, which consequently becomes a large burden for a user purchasing the terminal device in which the targeted function is not installed in the shipment stage and a bender who manufactures and sells the terminal device.

SUMMARY OF THE INVENTION

Therefore, a main object of the present invention is, in a communication management for handling transactions of acquiring information contents and functions, to properly acquire the information contents and the functions in the state in which a license for using a function standard required for realizing the function in the terminal device is being managed.

In order to solve any existing problem, the present invention comprises the following components. First, a constitution according to the present invention in a system basically adapted to transmit and receive the information contents is described.

The system according to the present invention comprises a terminal device comprising a hardware configuration capable of materializing optional information contents by adding a predetermined function thereto, a contents distribution device for distributing the information contents, a program distribution device for distributing a program for realizing the function used for the materialization in the terminal device of the information contents in the terminal device, and a license management device for managing a license for using a function standard required for realizing the function in the terminal device, wherein these devices are connected to one another to enable an intercommunication via an electric communication line.

The terminal device transmits device information of the terminal device and a request for acquiring information contents desired by a user of the terminal device identified based on an instruction input operation implemented to the terminal device by the user to the contents distribution device. The information contents desired by the user are received from the contents distribution device and the program required for the materialization of the desired information contents is received from the program distribution device. The information contents are materialized by means of the function acquired in the execution the received program.

The contents distribution device judges whether or not a new program for realizing the function for materializing the information contents in the terminal device transmitting the acquisition request is necessary based on the information contents required in the acquisition request received from the terminal device and the device information attached to the acquisition request. The contents distribution device transmits the information contents required in the received acquisition request to the terminal device when the new program is judged to be unnecessary. The contents distribution device designates the new program when it is judged to be necessary and transmits a request for distributing the designated program to the program distribution device, and further transmits a request for the license for using the function standard required for realizing the function in the terminal device to the license management device.

The license management device transmits an authorization for using the function standard required for realizing the function in the terminal device to the program distribution device and the contents distribution device in response to the reception of the usage license request.

The program distribution device transmits the program designated in the distribution request to the terminal device only when the usage authorization is received from the license management device.

In the case of demanding the new program in the terminal device, the contents distribution device transmits the information contents designated in the received acquisition request to the terminal device only when the usage authorization is received from the license management device.

Next, a constitution according to the present invention in a system basically adapted to transmit and receive the function is described.

The system according to the present invention comprises a terminal device comprising a hardware configuration capable of realizing an optional function on software, a program distribution device for distributing a program for realizing the function in the terminal device, a distribution management device for managing the distribution of the program, and a license management device for managing a license for using a function standard required for realizing the function in the terminal device, wherein these devices are connected to one another to enable an intercommunication via an electric communication line.

The terminal device transmits device information of the terminal device and a request for acquiring a function desired by a user of the terminal device identified based on an instruction input operation implemented to the terminal device by the user to the distribution management device. The program corresponding to the function desired by the user is received from the program distribution device and the received program is executed.

The distribution management device designates the program necessary for realizing the function in the terminal device transmitting the acquisition request based on the function designated in the acquisition request received from the terminal device and the device information attached to the acquisition request and transmits a request for distributing the designated program to the program distribution device, and further transmits a request for the license for using the function standard required for realizing the function in the terminal device to the license management device.

The license management device transmits an authorization for using the function standard required for realizing the function in the terminal device to the program distribution device in response to the reception of the usage license request.

The program distribution device transmits the program required for realizing in the terminal device the function desired by the user to the terminal device only when the usage authorization is received from the license management device.

According to the present invention, the user of the terminal device can acquire the desired function and the function necessary for the desired information contents in the state in which the license for the usage of the function standard required for realizing the function in the terminal device is being properly managed by merely transmitting the requests for the desired information contents and function to the contents distribution device and the distribution management device. Therefore, a level of convenience for the user of the terminal device can be remarkably increased. Further, the distribution of the function can be more precisely managed.

Further, a charge for acquiring the function used for materializing the information contents (to be specific, program for realizing the function in the terminal device) and a charge for using the function standard required for realizing the function in the terminal device are added to a charge for acquiring the information contents when the required function is acquired, which are then collectively charged. Thereby, it becomes unnecessary for the user of the terminal device to be particularly aware of the payment of the function (program) acquiring charge and the function standard usage charge. Thus, the level of convenience for the user of the terminal device can be increased in terms of the payment as well.

In the same manner, the function (program) acquisition charge and the usage charge for the function standard required for realizing the function are simultaneously charged when the necessary function is acquired as described. Then, the user of the terminal device does not have to purchase the terminal device at a price already including the usage charge for the function standard. The level of convenience for the user of the terminal device can be also increased in this regard.

In the case of providing a plurality of program distribution devices and function standards (license management devices), introduction information of those devices may be transmitted to the terminal device allowing the user of the terminal device to select optional devices from the introduced devices. Accordingly, the user of the terminal device can have a choice for the program distribution device and the license management device, which further increases the level of convenience.

BRIEF DESCRIPTION OF THE DRAWINGS

These and other objects as well as advantages of the invention will become clear by the following description of preferred embodiments and explicit in the appended claims of the invention. Many other benefits of the invention not cited in this specification will come to the attention of those skilled in the art upon implementing the present invention.

FIG. 2 is a block diagram of a terminal device constituting the download system according to the embodiment.

FIG. 19 is a flow chart of an operation of the settlement management device in the case of operating the download system as the information contents download system.

DETAILED DESCRIPTION OF THE INVENTION

Figure 1:
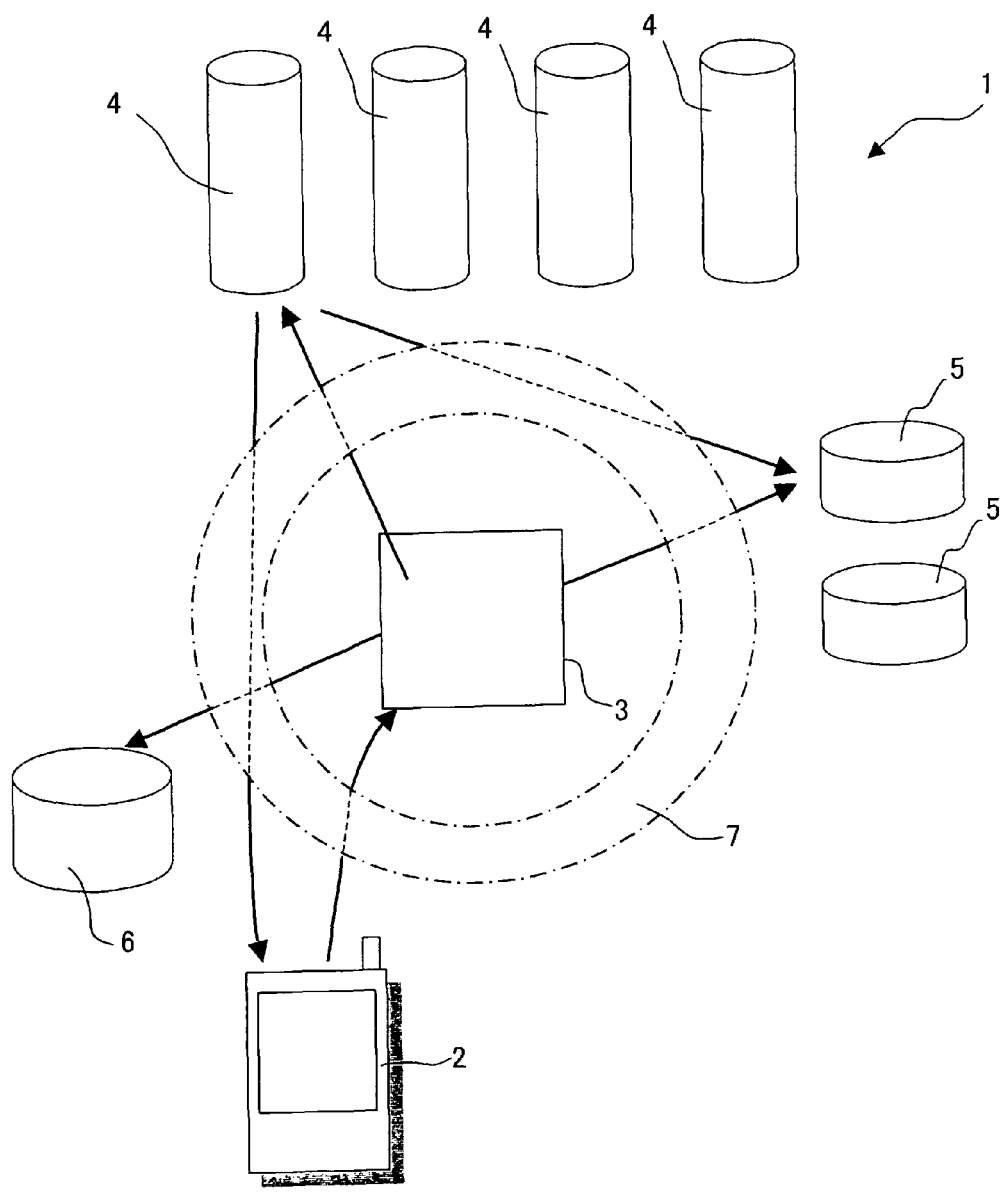
FIG. 1 shows a constitution of a download system according to a preferred embodiment of the present invention operating as a function download system or an information contents download system.

Hereinafter, a preferred embodiment of the present invention is described referring to the drawings.

Figure 3:
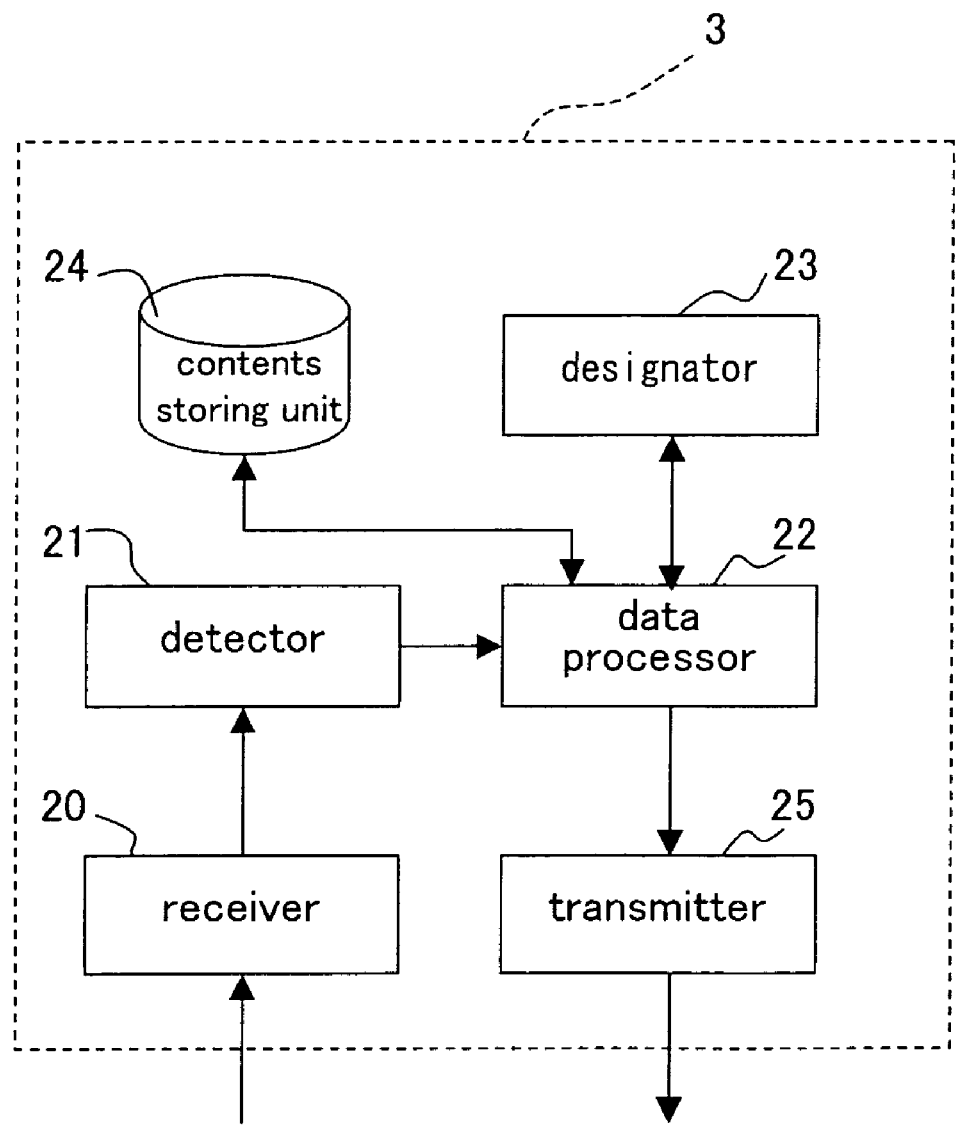
FIG. 3 is a block diagram of a contents distribution device constituting the download system according to the embodiment.
Figure 4:
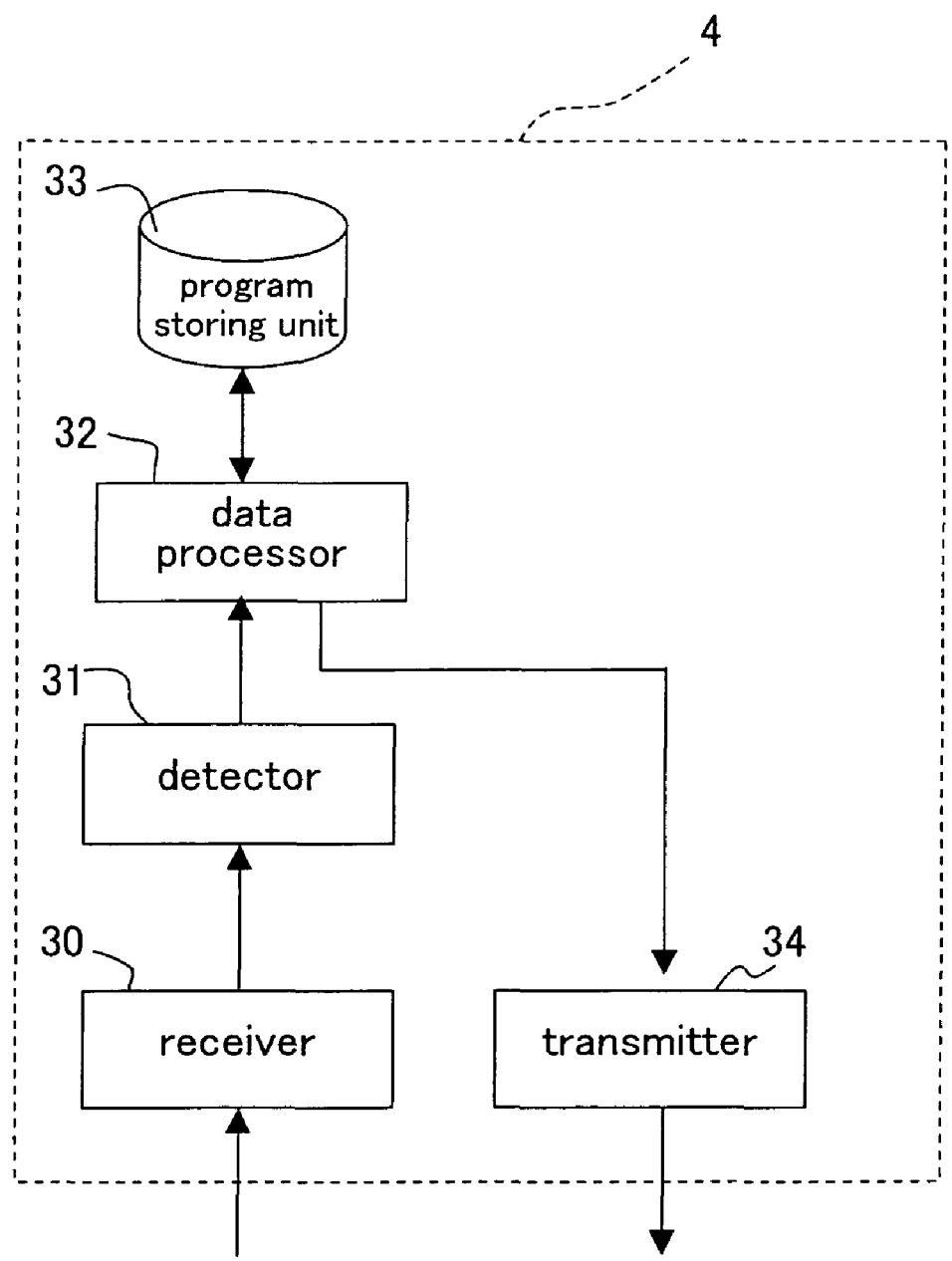
FIG. 4 is a block diagram of a program distribution device constituting the download system according to the embodiment.
Figure 5:
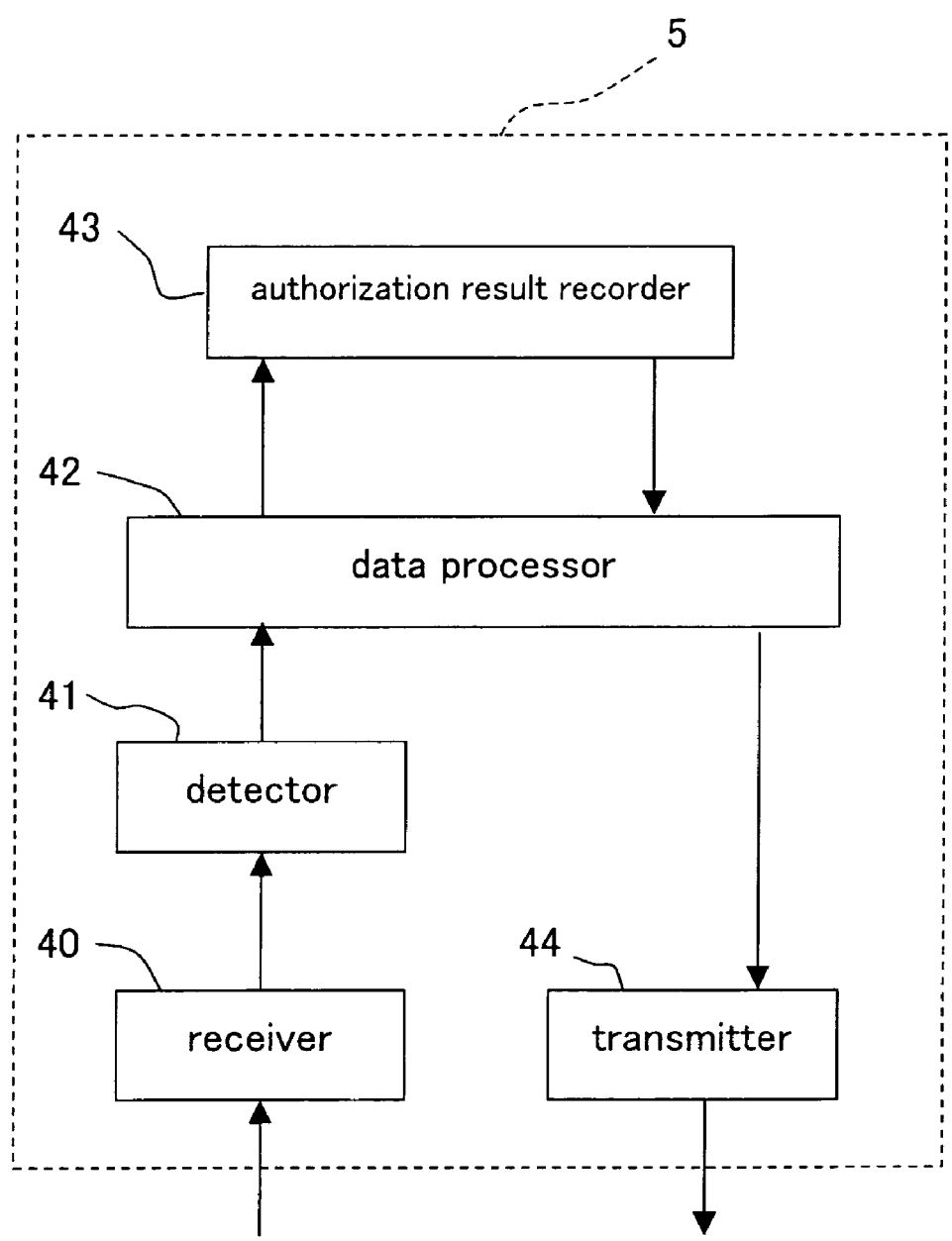
FIG. 5 is a block diagram of a license management device constituting the download system according to the embodiment.
Figure 6:
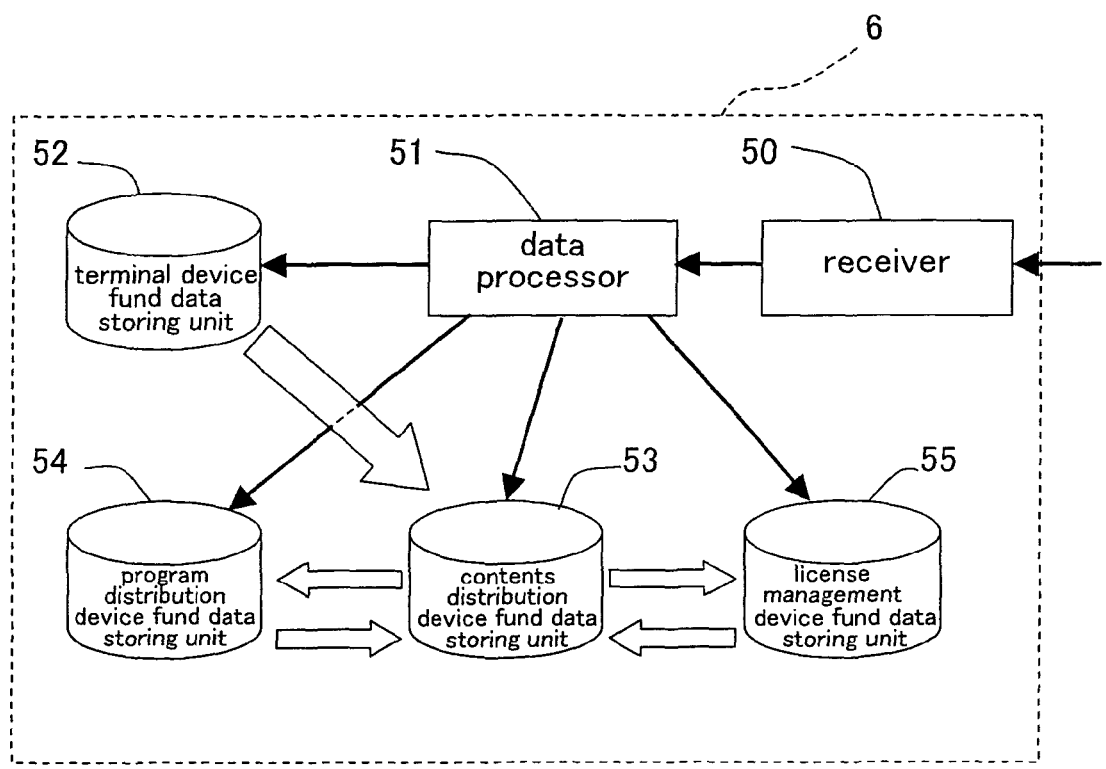
FIG. 6 is a block diagram of a settlement management device constituting the download system according to the embodiment.

FIG. 1 shows a constitution of a download system 1 according to a preferred embodiment of the present invention. FIG. 2 is a block diagram of a terminal device 2 constituting a part of the system 1. FIG. 3 is a block diagram of a contents distribution device 3 constituting a part of the system 1. FIG. 4 is a block diagram of a program distribution device 4 constituting a part of the system 1. FIG. 5 is a block diagram of a license management device 5 constituting a part of the system 1. FIG. 6 is a block diagram of a settlement management device 6 constituting a part of the system 1.

In the terminal device 2, a function can be optionally added within the scope of its processing ability.

In order to realize the addition of the function in the respective terminal devices 2 respectively having a different performance, various function standards are set in the respective functions. Further, some of the functions having the function standards require a usage license from the license management device 5 for managing the distribution of the function standards in order to realize the function in the terminal device 2. To be specific, the usage license can be obtained by paying a license fee to the license management device 5. In the present embodiment, the present invention is implemented in the system in which the function having the function standard requiring the usage license is later added to the terminal device 2.

An example of the function having the function standards relates to the before-mentioned MPEG4 as one of the image standards.

The download system 1 comprises the terminal device 2, contents distribution device 3, program distribution device 4, license management device 5 and settlement management device 6, wherein these devices 2 through 6 are connected to one another to enable an intercommunication via an internet line 7 which is an example of an electric communication line.

The terminal device 2 comprises a hardware configuration capable of materializing optional information contents by adding a predetermined function thereto. The present embodiment is premised on that a plurality of uses each has the terminal device 2. The present embodiment is further premised on that a plurality of terminal devices 2 respectively having a different device configuration is variously provided.

The contents distribution device 3 distributes the information contents via the internet line 7. The program distribution device 4 distributes a program for realizing in the terminal device 2 a function used in materializing the information contents in the terminal device 2 through the internet line 7. The license management device 5 is in charge of the management of the usage license for the function standard required for realizing the function in the terminal device 2.

The terminal device 2 comprises, as shown in FIG. 2, an input unit 10, a transmitter 11, a receiver 12, a detector 13, a data processor 14, a device information storing unit 15, a presenter 16 and an executor 17.

The input unit 10 has a function of receiving an instruction input operation carried out to the terminal device 2 by the user of the terminal device 2. The transmitter 11 has a function of transmitting signals of various types to the contents distribution device 3 via the internet line 7. The receiver 12 has a function of receiving signals of various types via the internet line 7. The detector 13 has a function of detecting whether or not the signal of various types are received in the receiver 12. The data processor 14 has a function of generating a signal to be transmitted via the internet line 7, a function of retrieving data from a signal received via the internet line 7 and a function of executing various signal processes to the data. The device information storing unit 15 is a database for storing device information of the terminal device 2. The device information is information representing the hardware configuration of the terminal device 2 and a configuration of a program (software) already installed in the terminal device 2. The program refers to software for realizing in the terminal device 2 the function used in materializing the various contents information in the terminal device 2. The presenter 16 comprises a display device, an audio generator and the like and has a function of presenting (display, audio processing and the like) the various information contents retrieved from the received (downloaded) signal to the user of the terminal device 2. The executor 17 has a function of materializing the various information contents by realizing an optional function in the terminal device 2. The respective functions are realized in the terminal device 2 through the execution of the previously stored program or program retrieved from the received signal. The term, program, used in this description refers to the foregoing programs. Further, a constitution of the executor 17 (a processing performance and a type of processable data in the executor 17) and a type and number of the programs already installed in the executor 17 are different in the respective terminal devices 2, which constitutes a part of function information.

The contents distribution device 3 comprises, as shown in FIG. 3, a receiver 20, a detector 21, a data processor 22, a designator 23, a contents storing unit 24 and a transmitter 25. The receiver 20 has a function of receiving the signal of various types via the internet line 7.

The detector 21 has a function of detecting whether or not the signals of various types are received in the receiver 20. The data processor 22 has a function of generating a signal to be transmitted via the internet line 7, a function of retrieving various data from a signal received via the internet line 7 and a function of executing various signal processes to the data. The designator 23 has a function of designating optional information contents, a function required for materializing the information contents and program for realizing the function in the respective terminal devices 2 based on the data retrieved by the data processor 22. The contents storing unit 24 is a database for storing the various information contents such as image data and music data and has a function of identifying and reading optional contents from the stored information contents based on the designation of the designator 23. The transmitter 25 has a function of transmitting the signal generated in the data processor 22.

The program distribution device 4 comprises, as shown in FIG. 4, a receiver 30, a detector 31, a data processor 32, a program storing unit 33 and a transmitter 34. The receiver 30 has a function of receiving signals of various types via the internet line 7. The detector 31 has a function of detecting whether or not the signals of various types are received in the receiver 30. The data processor 32 has a function of generating a signal to be transmitted via the internet line 7, a function of retrieving various data from a signal received via the internet line 7 and a function of executing various signal processes to the data. The program storing unit 33 is a database for storing a program required for realizing an optional function in the terminal device 2. The transmitter 34 has a function of transmitting the signal generated in the data processor 32.

The license management device 5 comprises, as shown in FIG. 5, a receiver 40, a detector 41, a data processor 42, an authorization result recorder 43 and a transmitter 44.

The receiver 40 has a function of receiving signals of various types via the internet line 7. The detector 41 has a function of detecting whether or not the signals of various types are received in the receiver 40. The data processor 42 has a function of generating a signal to be transmitted via the internet line 7, a function of retrieving various data from a signal received via the internet line 7 and a function of executing various signal processes to the data. The data process includes an information processing (management processing for authorized usage license) relating to usage authorization (denoting the license for using the function standard) required for realizing the function in the terminal device 2. The authorization result recorder 43 has a function of recording authorized usage license management information. The transmitter 44 has a function of transmitting the signal generated in the data processor 42.

The settlement management device 6 comprises, as shown in FIG. 6, a receiver 50, a data processor 51, a terminal device fund data storing unit 52, a contents distribution device fund data storing unit 53, a program distribution device fund data storing unit 54 and a license management device fund data storing unit 55. The receiver 50 receives a signal including charge information from the contents distribution device 3 via the internet line 7. The data processor 51 reads the charge information from the signal received from the contents distribution device 3 and executes various signal processes to the information. The terminal device fund data storing unit 52 is supplied with fund data of the terminal device 2. The contents distribution device fund data storing unit 53 is supplied with fund data of the contents distribution device 3. The program distribution device fund data storing unit 54 is supplied with fund data of the program distribution device 4. The license management device fund data storing unit 55 is supplied with fund data of the license management device 5. The terminal device fund data storing unit 52 is previously supplied with the fund data by the user of the terminal device 2 in order to operate the download system 1 and executes a charge operation.

Hereinafter, operations of transmitting/receiving the information contents by the download system 1 are described referring to flow charts of FIGS. 7 through 10.

Figure 7:
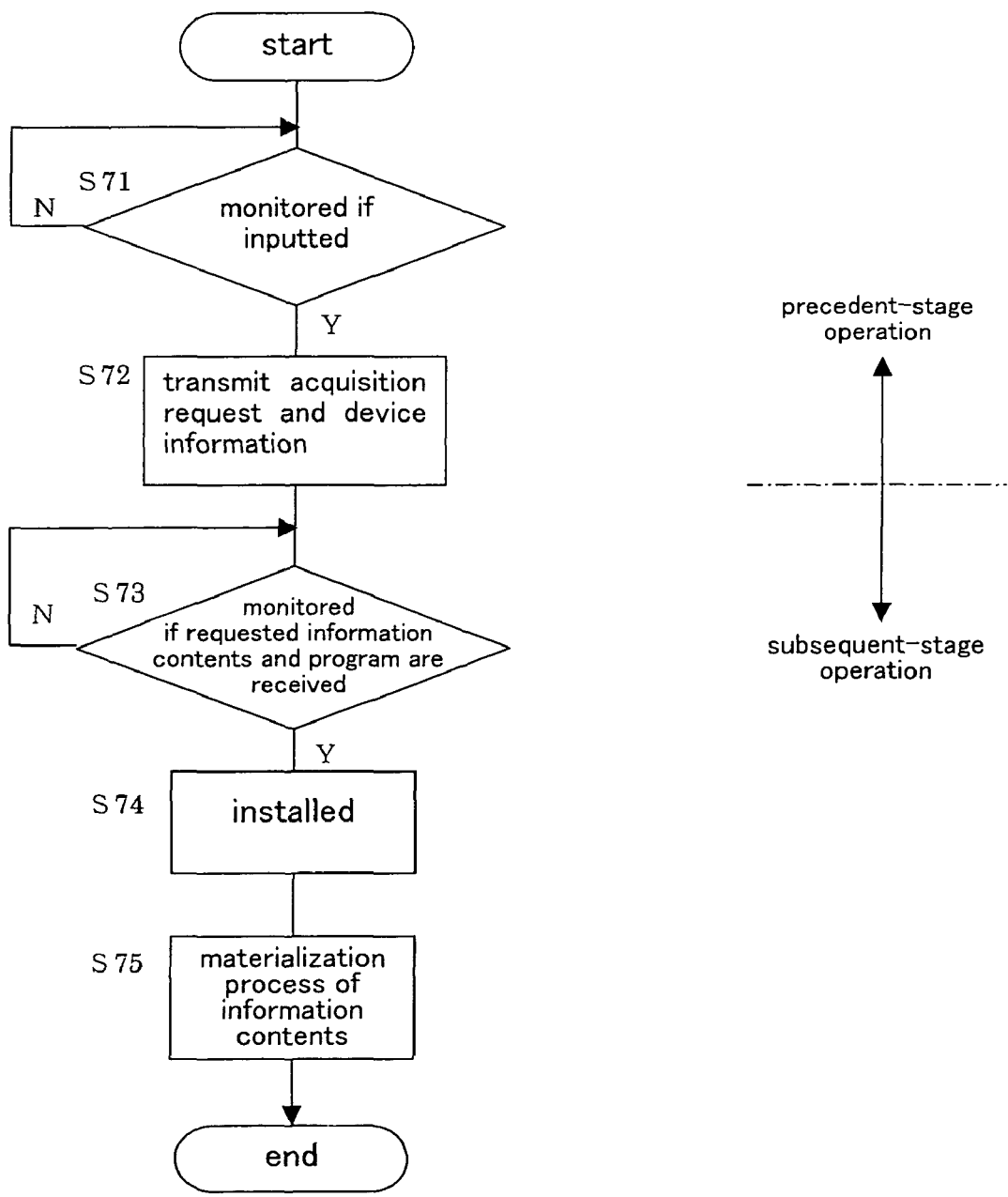
FIG. 7 is a flow chart of an operation of the terminal device in the case of operating the download system as the information contents download system.

First, an operation of the terminal device 2 is described referring to the flow chart of FIG. 7.

In the optional terminal device 2, it is monitored whether or not the user of the terminal device 2 carries out the instruction input operation to the input unit 10 (S71). In the instruction input operation, information designating information contents, which the user desires to download, is inputted. When it is confirmed that the instruction input operation is carried out in the S71, in the data processor 14, the information contents desired by the user is identified based on the inputted data, and then, a request for acquiring the desired information contents is generated. Further, in the data processor 14, the device information of the terminal device 2 is read from the device information storing unit 15 and attached to the acquisition request. The acquisition request with the device information is transmitted to the transmitter 11. In the transmitter 11, the acquisition request and the device information transmitted from the data processor 14 are transmitted to the contents distribution device 3 via the internet line 7 (S72).

So far was described a precedent-stage operation of the terminal device 2 (operation relating to the output of the acquisition request).

Figure 8:
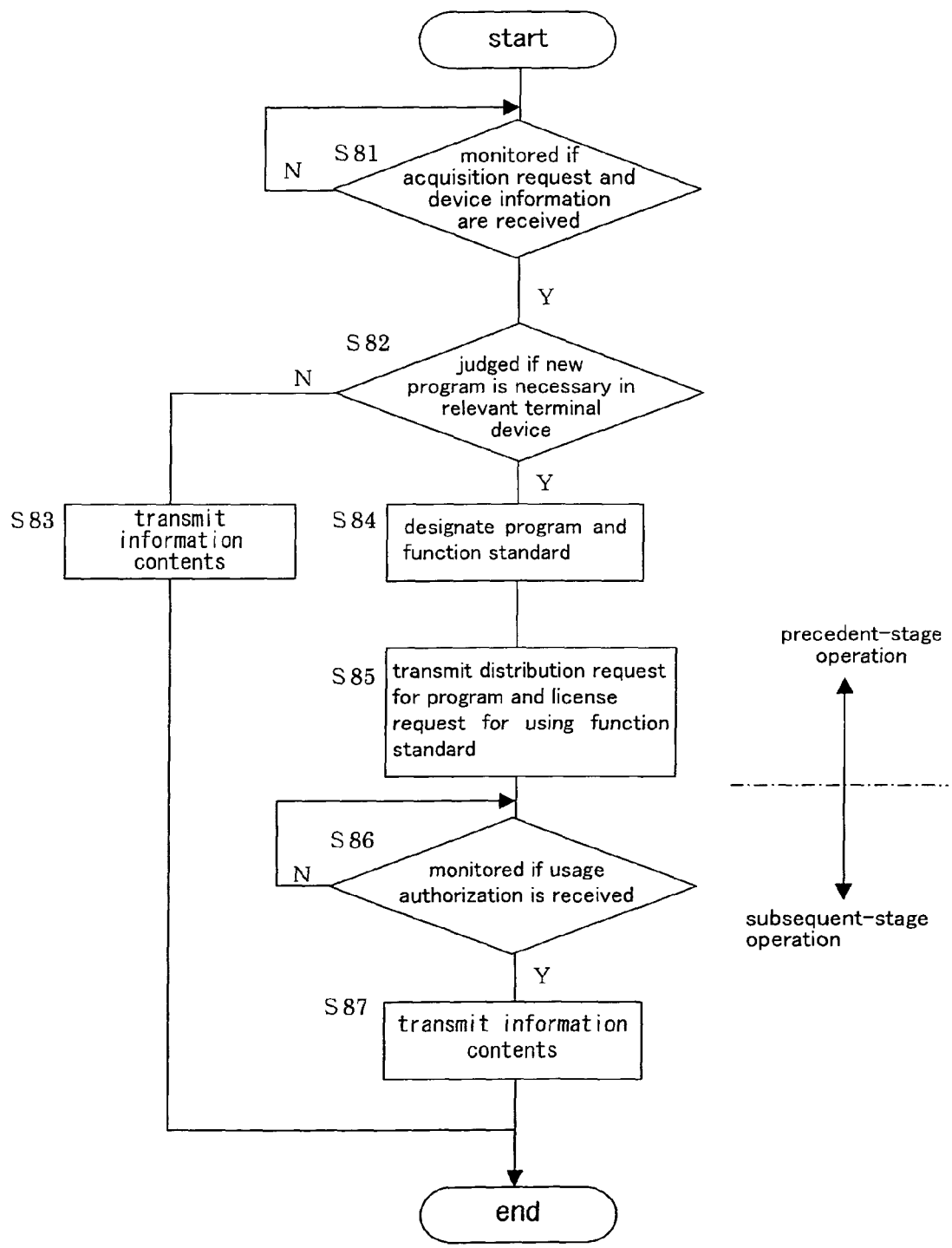
FIG. 8 is a flow chart of an operation of the contents distribution device in the case of operating the download system as the information contents download system.

Next, a precedent-stage operation of the contents distribution device 3 for receiving the acquisition request from the terminal device 2 is described referring to FIG. 8. In the contents distribution device 3, it is monitored whether or not the acquisition request and the device information are received from the terminal device 2 via the internet line 7 (S81) by the detector 21. When it is detected in the S81 that the acquisition request and the device information are received, the data processor 22 transmits the received acquisition request to the designator 23. The designator 23 judges whether or not a new program for realizing a function for materializing the information contents in the terminal device 2 transmitting the acquisition is necessary based on the information contents requested in the received acquisition request and the device information attached to the acquisition request (S82).

When the new program is judged to be unnecessary in the S82, the data processor 23 reads the information contents requested in the received acquisition request (desired by the terminal device 2) from the contents storing unit 24 and transmits the read information contents to the transmitter 25. The transmitter 25 generates a signal including the information contents and transmits the signal to the terminal device 2 (S82). Then, a sequence of processes is terminated.

When the new program is judged to be necessary in the S82, the data processor 23 identifies a function required for materializing the information contents desired by the terminal device 2 transmitting the acquisition request based on the received acquisition request and the device information. Further, the designator 23 designates a program required for realizing the function in the terminal device 2 (S84).

As examples of the information contents can be mentioned image data recorded in an image recording format of MPEG4 and audio data recorded in au audio recording format of MP3. As an example of the function can be mentioned a function required for reproducing the image data and the audio data (MPEG4 reproduction function and MP3 reproduction function), which can be identified based on the information contents and the device configuration of the terminal device 2. Further, a program required for realizing the identified function and a function standard required for realizing the function in the terminal device 2 are identified. The function standard to be designated is a function standard under the management of the license management device 5, for which a charge is generated when used. In contrast to that, there are function standards free of the management by the license management device 5, for which no charge is generated when used, however, such function standards are not to be designated by the designator 23. The respective terminal devices 2 require the different functions, programs (particularly, program), and further, function standards because the constitution, processing performance and the like of the executor 17 are different in each terminal device 2.

When the program is designated by the designator 23 in the S84, a request for distributing the program and a license request for using the function standard are generated in the data processor 22 and transmitted to the transmitter 25. The transmitter 25, in response to the receipt of these requests, generates a signal including the requests and transmits the distribution request for the program to the program distribution device 4 and the usage license request for the function standard to the license management device 5 (S85). The transmitted usage license request for the function standard includes numeral data denoting the number of the terminal devices 2 simultaneously requesting the usage license for the function standard.

So far was described the precedent-stage operation of the contents distribution device 3 (operation relating to the output of the distribution request).

Figure 9:
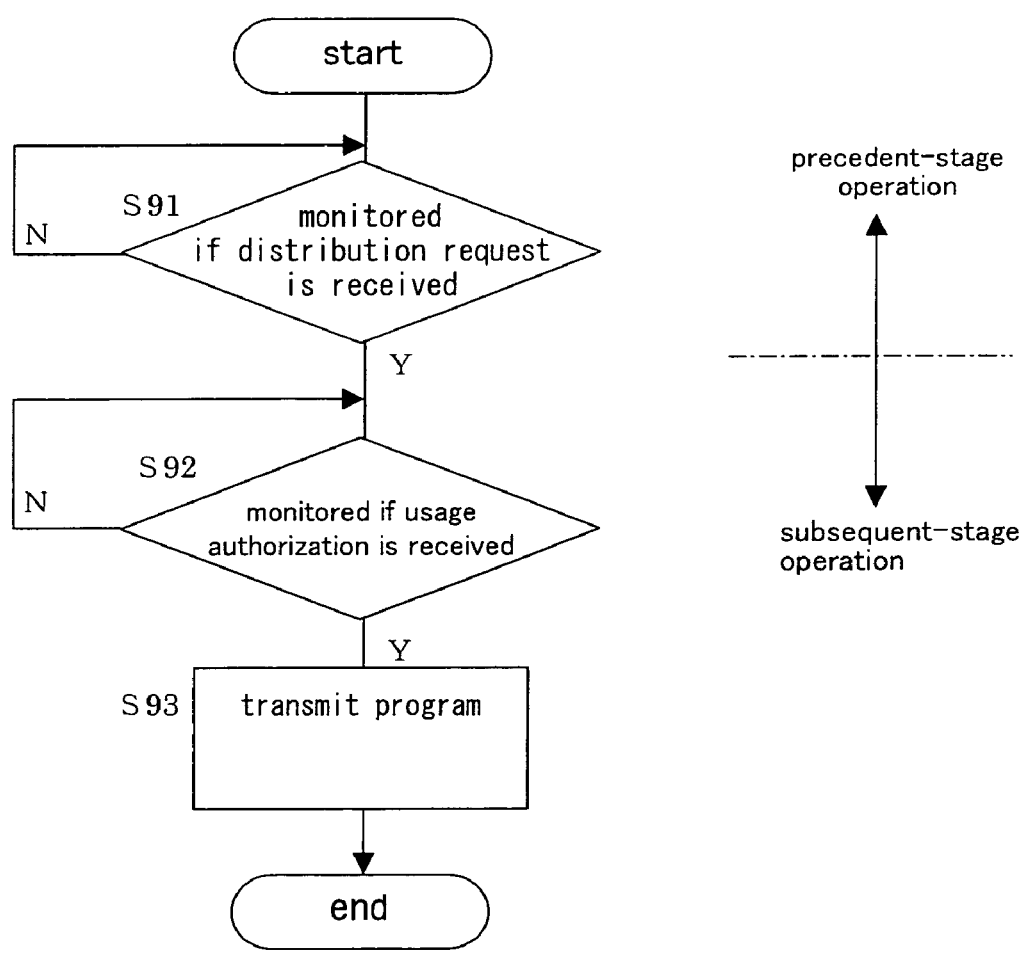
FIG. 9 is a flow chart of an operation of the program distribution device in the case of operating the download system as the information contents download system.

Next, a precedent-stage operation of the program distribution device 4 for receiving the distribution request from the contents distribution device 3 is described referring to FIG. 9.

It is monitored in the program distribution device 4 whether or not the distribution request is received from the contents distribution device 3 via the internet line 7 (S91) by the detector 31. When it is detected in the S91 that the distribution request is received, it is further monitored whether or not the usage license is received from the license management device 5 (S92) by the detector 31. The precedent-stage operation of the program distribution device 4 (operation relating to the output of the program) was described above.

Figure 10:
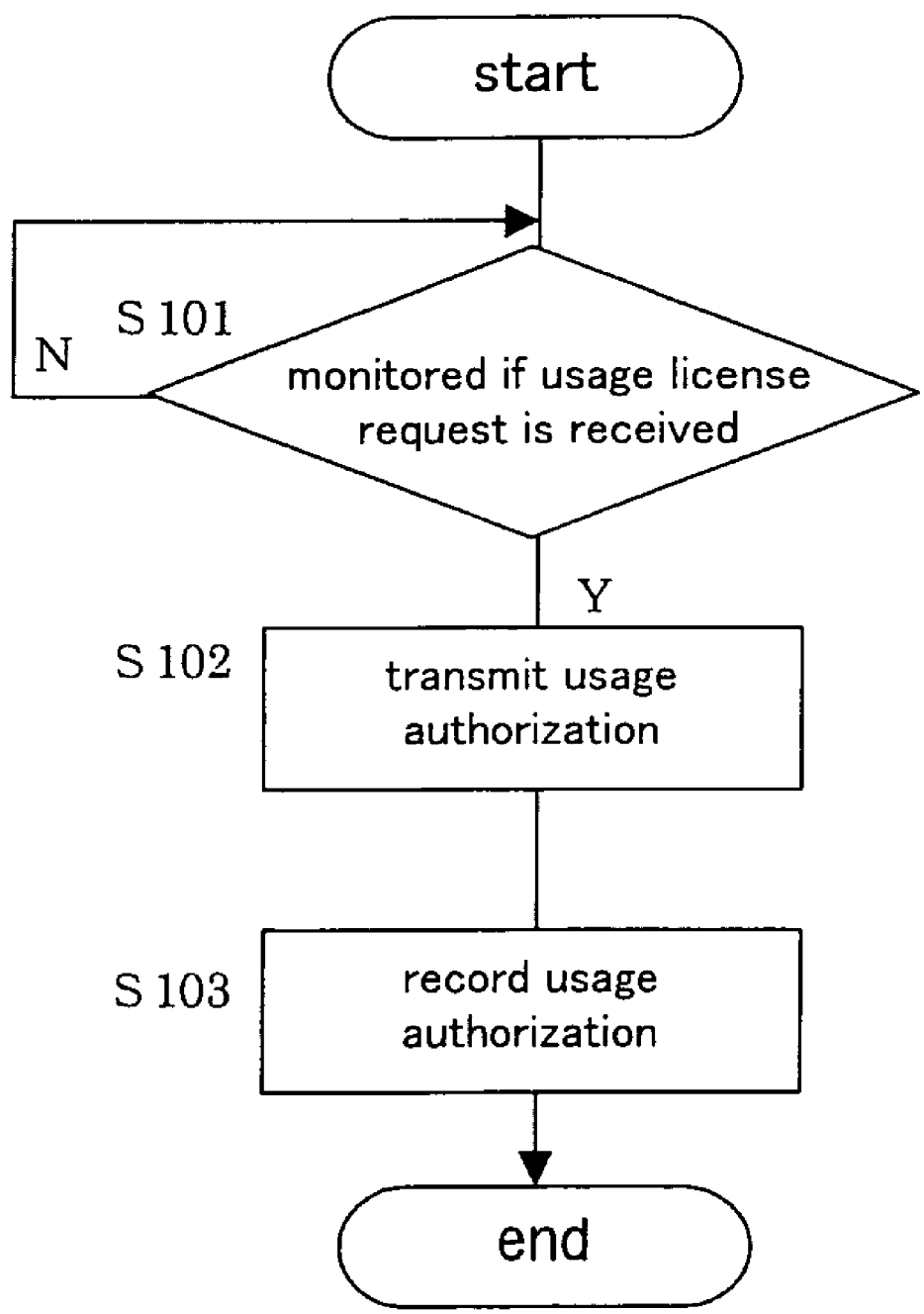
FIG. 10 is a flow chart of an operation of the license management device in the case of operating the download system as the information contents download system.

Next, an operation of the license management device 5 for receiving the usage license request for the function standard from the contents distribution device 3 is described referring to FIG. 10.

In the license management device 5, it is continuously monitored whether or not the signal including the usage license request for the function standard is received from the contents distribution device 3 via the internet line 7 (S101) by the detector 41. When the reception of the signal including the usage license request is detected in the S101, the data processor 42 extracts the usage license request from the received signal to thereby generate a usage authorization corresponding to the usage license request and transmits the authorization to the transmitter 44. The generated usage authorization is information representing the license for using the function standard, which includes numeral data denoting the number of the terminal devices 2 for which the usage of the function standard is authorized. The transmitter 44 transmits a signal including the transmitted usage authorization to the contents distribution device 3 and the program distribution device 4 (S102). In the data processor 42, after the transmission of the usage authorization, the output result of the usage authorization (including the numeral data denoting the number of the terminal devices 2 for which the usage of the function standard is authorized) is recorded in the authorization result recorder 43. Then, a sequence of processes of the license management device 5 is terminated.

Next, an operation (subsequent stage) of the program distribution device 4 after the program is transmitted in the S92 is described referring to FIG. 9.

In the detector 31, it is monitored whether or not the signal including the usage authorization is received from the license management device 5 (S92). When the reception of the signal including the usage authorization is confirmed in the S92, the data processor 32 reads a program required for materializing the information contents desired by the terminal device 2 from the program storing unit 33 and transmits the program to the transmitter 34. The transmitter 34 generates a signal including the program and transmits the signal to the terminal device 2 (S93). The distribution request whose reception was confirmed in the S91 is previously memorized in the data processor 32 and the like, and the program transmitted in the S93 is identified based on the previously memorized distribution request.

Next, an operation (subsequent stage) of the contents distribution device 3 after the distribution request for the program and the usage license request are transmitted in the S85 is described referring to FIG. 8. In the detector 21, it is monitored whether or not the signal including the usage authorization is received from the license management device 5 (S86). When the reception of the signal including the usage authorization is confirmed in the S86, the data processor 22 reads the information contents requested in the received acquisition request (desired by the terminal device 2) from the contents storing unit 24 and transmits the read information contents to the transmitter 25. The transmitter 25 generates a signal including the information contents and transmits the signal to the terminal device 2 (S87).

The acquisition request whose reception was confirmed in the S81 is previously memorized in the data processor 22 and the like, and the information contents transmitted in the S87 are identified based on the previously memorized acquisition request. In the contents distribution device 3, a sequence of processes is terminated when the transmission of the program (S87) is completed.

Next, an operation of the terminal device 2 after the information contents acquisition request and the device information are transmitted in the S72 is described referring to FIG. 7.

After the acquisition request and the device information are transmitted in the S72, the terminal device 2 monitors the receptions (S73). More specifically, in the terminal device 2, it is monitored whether or not the desired information contents are received from the contents distribution device 3 and whether or not the program required for materializing the information contents (image display process, sound production process and the like in the executor 17) is received from the program distribution device 4, and these are monitored by the detector 13.

The detector 13, after the confirmation of the reception of the information contents and the program in the S73, notifies the data processor 14 of the reception. The data processor 14 notified of the reception installs the received program in the executor 17 (S74).

In the data processor 14, the received information contents are materialized (image process and sound production process) in the presenter 16 (S75). The materialization process is executed by a function exerted by the installed program.

So far were described the processes executed when the download system 1 functions as the information contents download system. Next, operations of transmitting/receiving a function program in the case of the download system 1 functioning as the function download system are described referring to flow charts of FIGS. 11 through 14. In this case, the contents distribution device 3 functions as a distribution management device.

Figure 11:
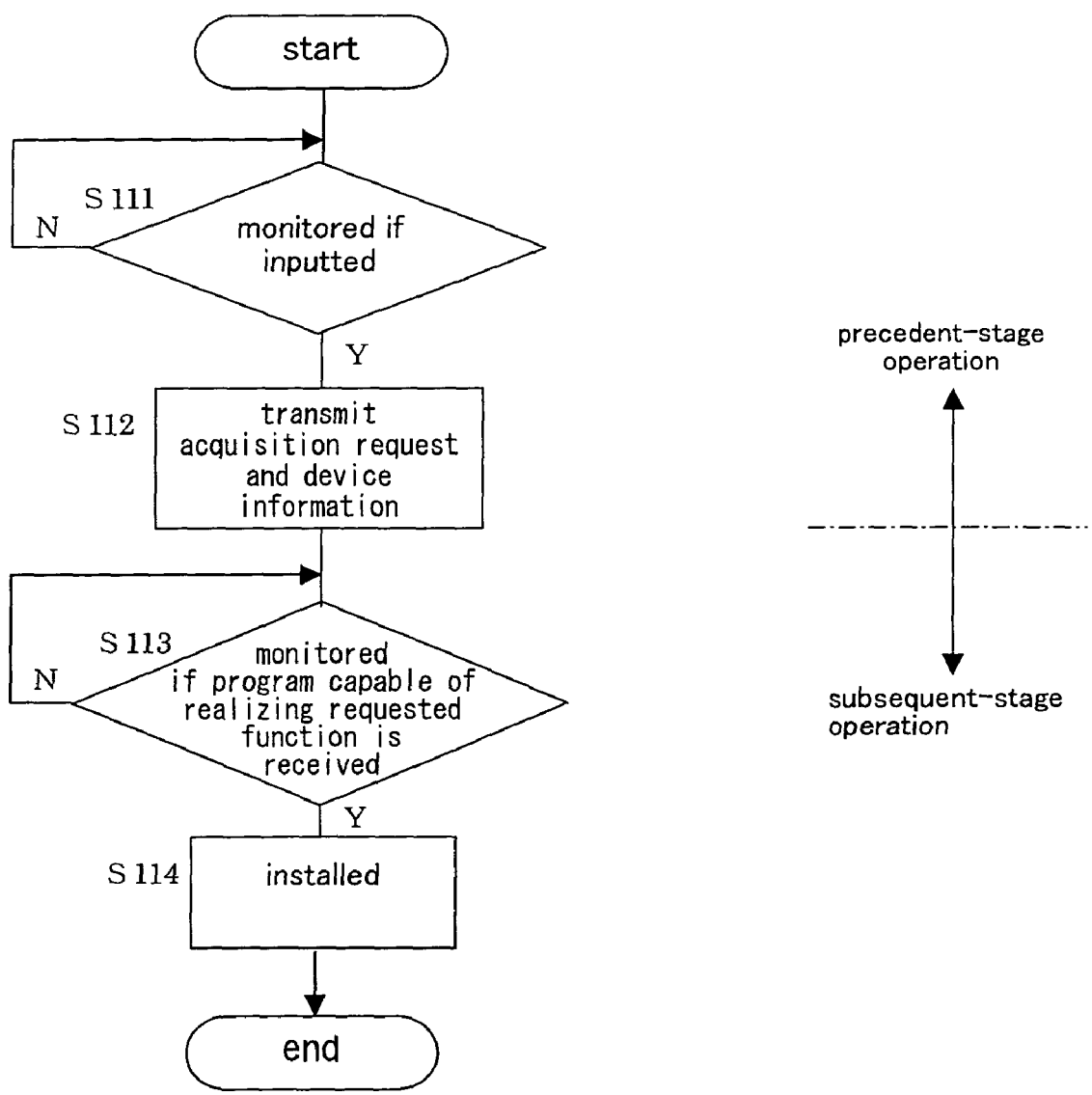
FIG. 11 is a flow chart of an operation of the terminal device in the case of operating the download system as the function download system.

First, an operation of the terminal device 2 is described referring to the flow chart of FIG. 11.

In the optional terminal device 2, it is monitored whether or not the user of the terminal device 2 carries out the instruction input operation to the input unit 10 (S111). In the instruction input operation, information designating a function which the user desires to download is inputted. When it is confirmed that the instruction input operation is carried out in the S111, the function desired by the user is identified based on the inputted data, and then, a request for acquiring the desired function is generated in the data processor 14. Further, in the data processor 14, the device information of the terminal device 2 is read from the device information storing unit 15 and attached to the acquisition request. The acquisition request with the device information is transmitted to the transmitter 11. In the transmitter 11, the acquisition request and the device information transmitted from the data processor 14 are transmitted to the contents distribution device 3 via the internet line 7 (S112).

So far was described a precedent-stage operation of the terminal device 2 (process relating to the output of the acquisition request).

Figure 12:
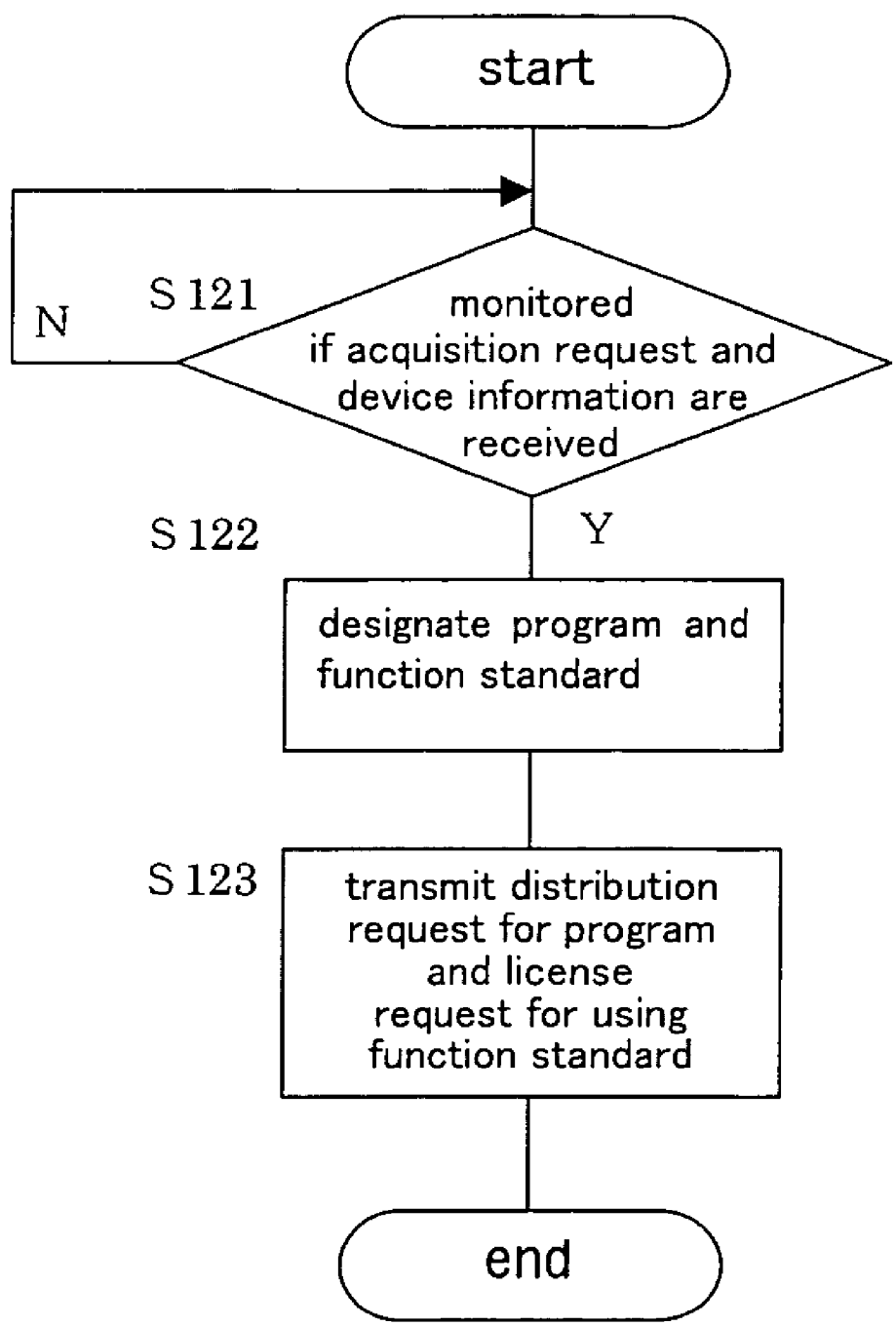
FIG. 12 is a flow chart of an operation of the contents distribution device in the case of operating the download system as the function download system.

Next, an operation of the contents distribution device 3 for receiving the acquisition request from the terminal device 2 is described referring to FIG. 12. In the contents distribution device 3, it is monitored whether or not the acquisition request and the device information are received from the terminal device 2 via the internet line 7 (S121) by the detector 21. When the reception of the acquisition request and the device information are detected in the S121, the data processor 22 transmits the received acquisition request to the designator 23. The designator 23 designates a program required for realizing the desired function in the terminal device 2 transmitting the acquisition request and the function standard required for realizing the function in the terminal device 2 based on the received acquisition request and device information (S122).

As examples of the function can be mentioned the MPEG4 reproduction function and MP3 audio data reproduction function, and the program required for realizing the function in the terminal device 2 and the function standard required for realizing the function in the terminal device 2 are designated based on these functions. The function standard to be designated is a function standard under the management of the license management device 5, for which a charge is generated when used. In contrast to that, there are function standards free of the management by the license management device 5, for which no charge is generated when used, which are, however, not to be designated by the designator 23. The respective terminal devices 2 each demands a different program due to the differences in the constitutions, processing performances and the like of the executors 17 thereof.

When the program and the function standard are designated by the designator 23 in the S122, a request for distributing the program and a license request for using the function standard are generated in the data processor 22 and transmitted to the transmitter 25. The transmitter 25, in response to the receipt of the distribution request and the usage license request, generates a signal including these requests and transmits the signals to the program distribution device 4 and the license management device 5 (S123).

So far was described the precedent-stage operation of the contents distribution device 3 (process relating to the output of the distribution request). In the contents distribution device 3, a sequence of processes is terminated when the execution of the step S123 is completed.

Next, a precedent-stage operation of the program distribution device 4 for receiving the distribution request from the contents distribution device 3 is described referring to FIG. 9.

It is monitored in the program distribution device 4 whether or not the distribution request is received from the contents distribution device 3 via the internet line 7 (S131) by the detector 31. When it is detected in the S131 that the distribution request is received, it is further monitored whether or not the usage authorization is received from the license management device (S132) also by the detector 31.

The precedent-stage operation of the program distribution device 4 was described above.

Figure 14:
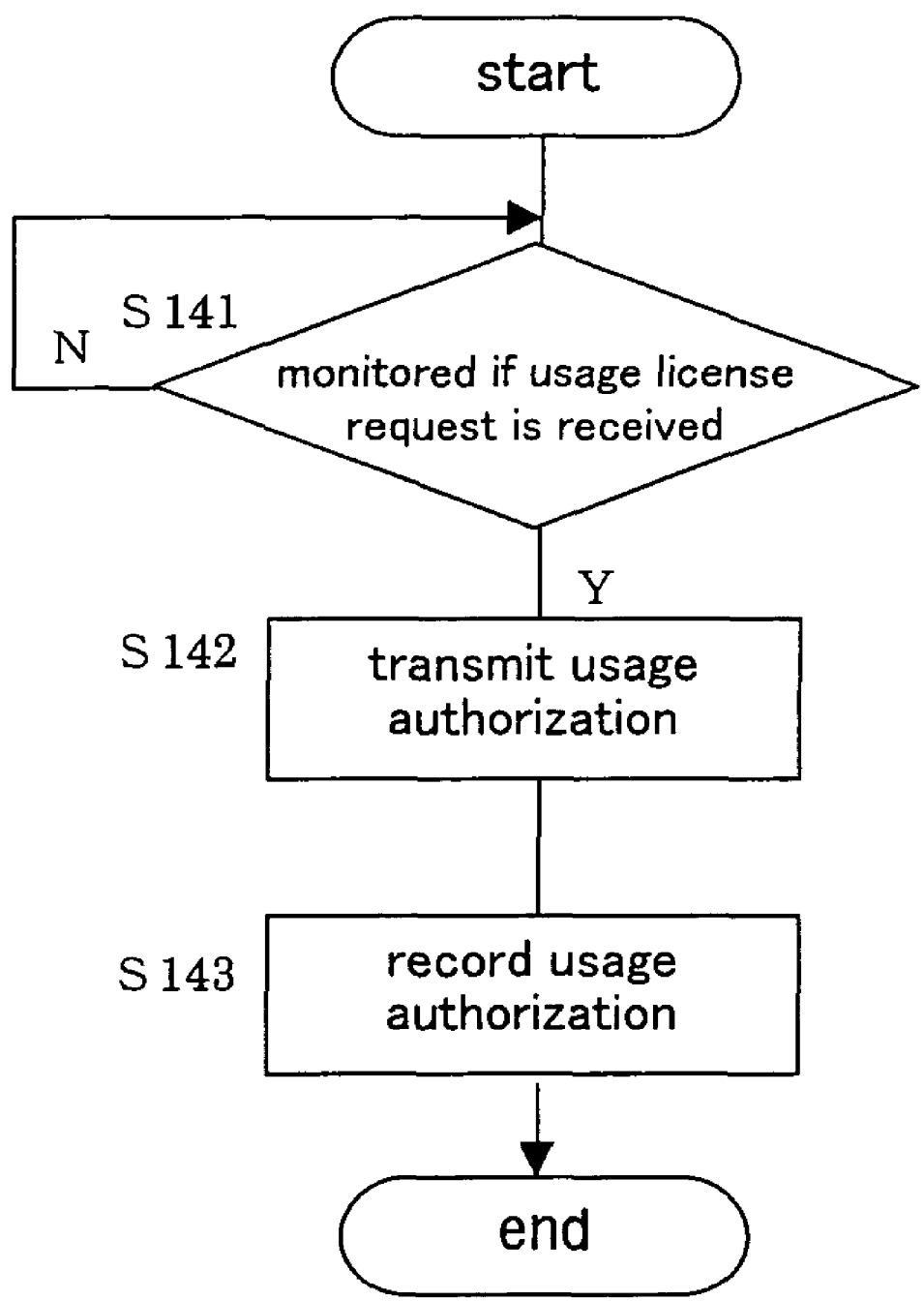
FIG. 14 is a flow chart of an operation of the license management device in the case of operating the download system as the function download system.

Next, an operation of the license management device 5 for receiving the usage license request for the function standard from the contents distribution device 3 is described referring to FIG. 14.

In the license management device 5, it is continuously monitored whether or not the signal including the usage license request for the function standard is received from the contents distribution device 3 via the internet line 7 (S141) by the detector 41. When the reception of the signal including the usage license request is detected in the S141, the data processor 42 extracts the usage license request from the received signal to thereby generate the usage authorization corresponding to the usage license request and transmits the authorization to the transmitter 44. The generated usage authorization is information representing the license for using the function standard, which includes the numeral data denoting the number of the terminal devices 2 for which the usage of the function standard is authorized. The transmitter 44 transmits the signal including the transmitted usage authorization to the contents distribution device 3 and the program distribution device 4 (S142). In the data processor 42, after the transmission of the usage authorization, the output result of the usage authorization (including the numeral data denoting the number of the terminal devices 2 for which the usage of the function standard is authorized) is recorded in the authorization result recorder 43 (S143). Then, a sequence of processes of the license management device 5 is terminated.

Figure 13:
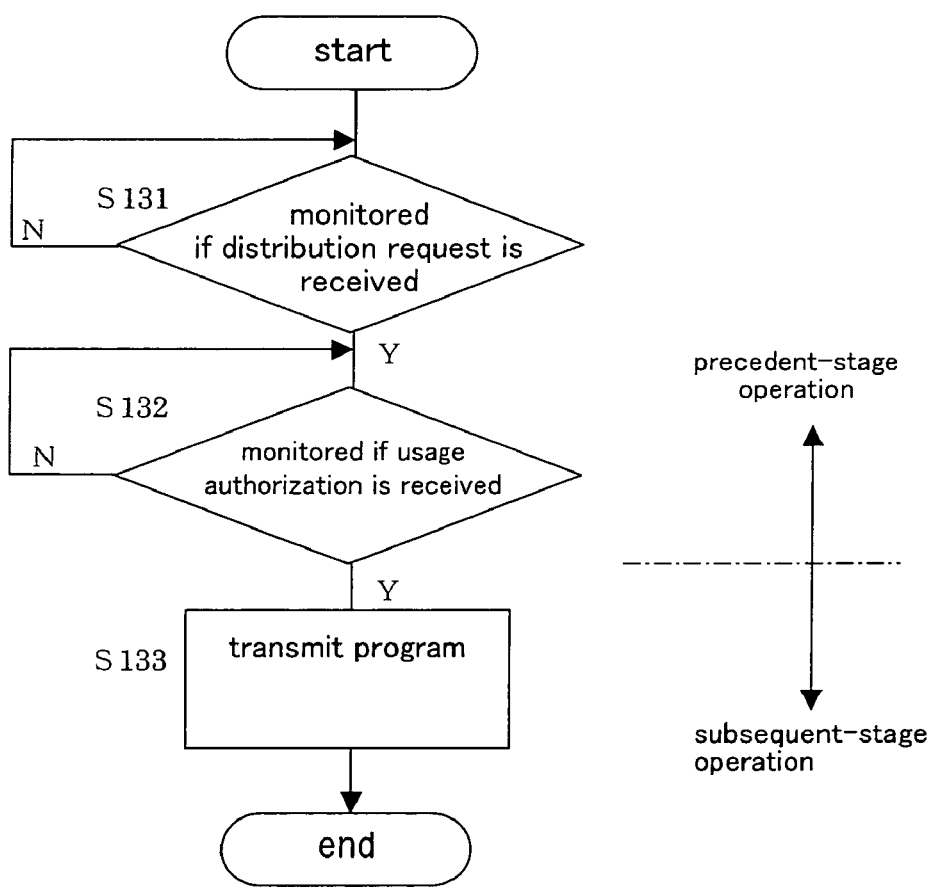
FIG. 13 is a flow chart of an operation of the program distribution device in the case of operating the download system as the function download system.

Next, an operation (subsequent stage) of the program distribution device 4 after the program is transmitted in the S132 is described referring to FIG. 13.

In the detector 31, it is monitored whether or not the signal including the usage authorization is received from the license management device 5 (S132). When the reception of the signal including the usage authorization is confirmed in the S132, the data processor 32 reads a program required for realizing the function desired by the terminal device 2 from the program storing unit 33 and transmits the program to the transmitter 34. The transmitter 34 generates a signal including the program and transmits the signal to the terminal device 2 (S133). The distribution request received in the S131 is previously memorized in the data processor 32 and the like, and the program transmitted in the S133 is identified based on the previously memorized distribution request.

Next, an operation of the terminal device 2 after the function acquisition request and the device information are transmitted in the S112 is described referring to FIG. 11.

After the acquisition request and the device information are transmitted in the S112, in the terminal device 2, it is monitored whether or not the program for realizing the desired function is received from the program distribution device 4 (S113) by the detector 13.

The data processor 14 notified of the reception of the program by the detector 13 in the S113 installs the received program in the executor 17 (S114).

Figure 15:
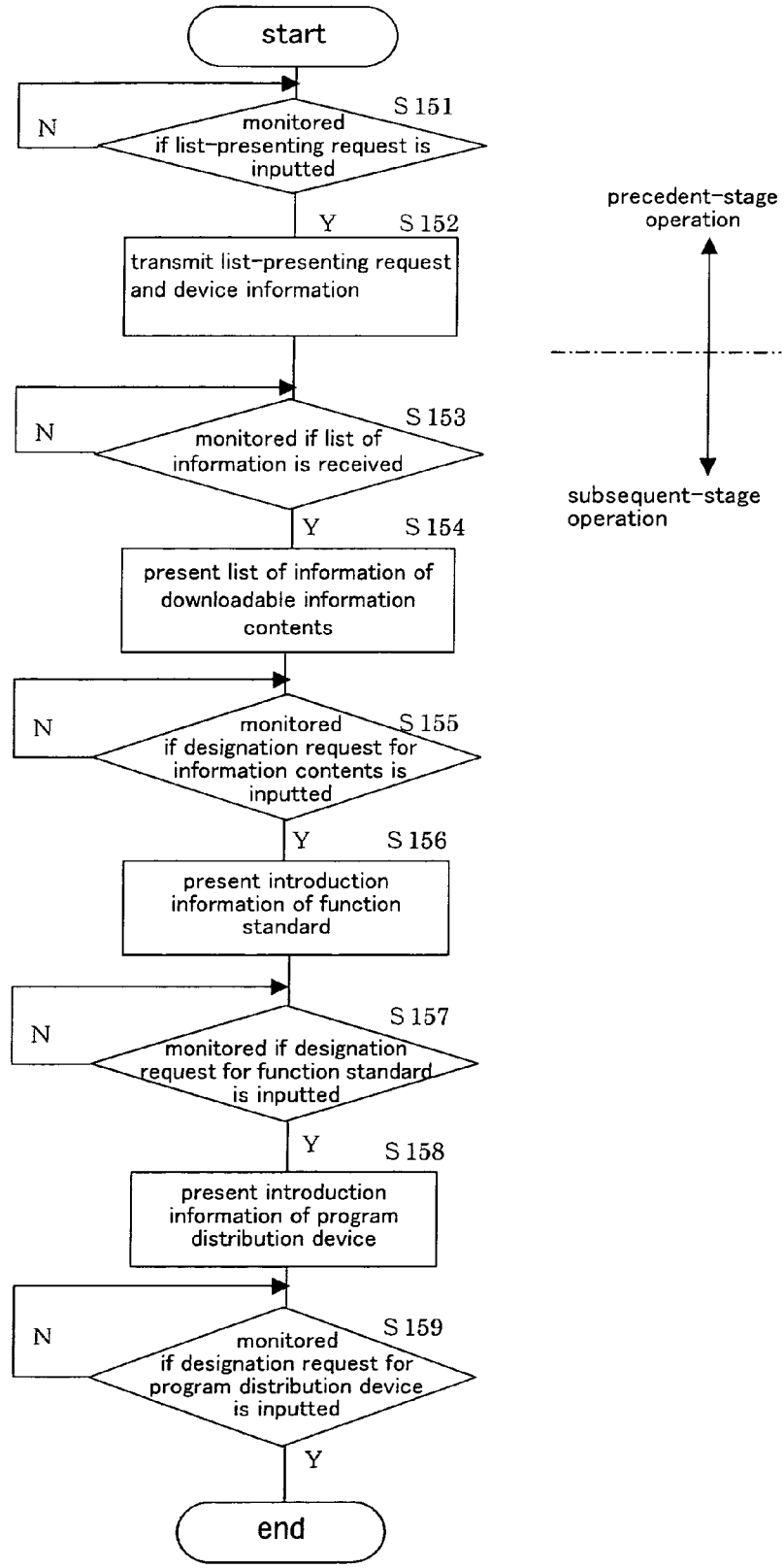
FIG. 15 is a flow chart of a precedent-stage operation of a terminal device according to a first modified example of the embodiment.
Figure 16:
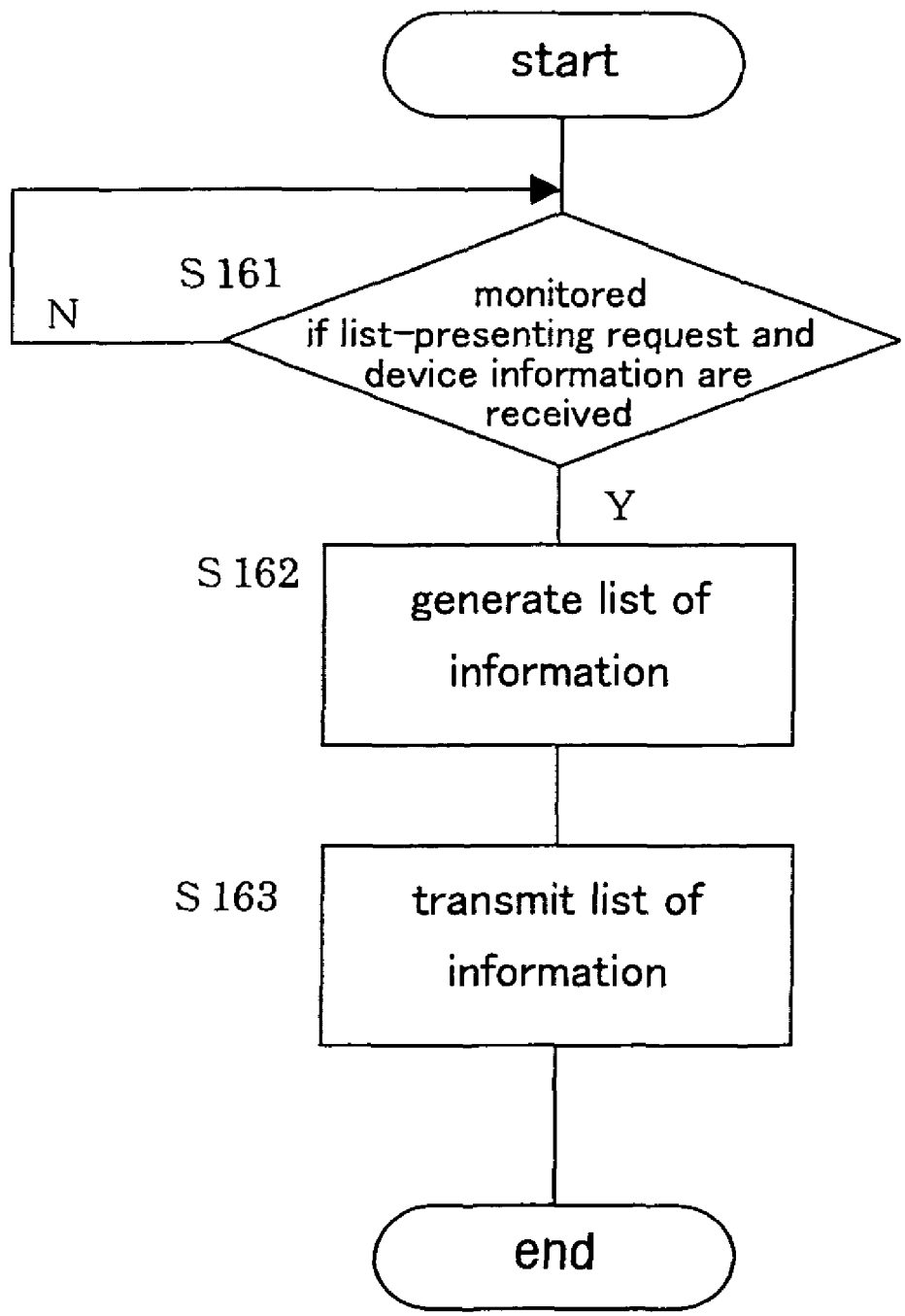
FIG. 16 is a flow chart of a precedent-stage operation of a contents distribution device according to the first modified example of the embodiment.

Next is described a case in which the download system 1 is operated as the information contents download system under the following conditions is described referring to flow charts of FIGS. 15 and 16.

There are a plurality of downloadable information contents and functions in the terminal device 2.

There is a plurality of program distribution devices 4, each comprising a program capable of realizing a same function while having a different constitution.

Though one function standard is necessary for realizing a function in the terminal device 2, a plurality of function standards are capable of realizing one function, and a plurality of license management devices 5 is provided in response to the plurality of function standards.

First, an operation of the terminal device 2 is described referring to the flow chart of FIG. 15. The operation described below is carried out as a process prior to the S111 in the flow chart of FIG. 11.

In the terminal device 2, it is monitored whether or not the user of the terminal device 2 inputs a request for presenting a list to the input unit 10 (S151). The request for the list indicates a request for downloading a list of information relating to the information contents, which are downloadable into the terminal device 2, from the contents distribution device 3. When the input of the request for presenting the list is confirmed in the S151, a request for presenting the list is generated in the data processor 14. Further, in the data processor 14, the device information of the terminal device 2 is read from the device information storing unit 15 and attached to the list-presenting request. The list-presenting request with the device information is transmitted to the transmitter 11. The transmitter 11 transmits the list-presenting request and the device information transmitted from the data processor 14 to the contents distribution device 3 via the internet line 7 (S152).

So far was described a precedent-stage operation of the terminal device 2 (process relating to the output of the list-presenting request).

Next, an operation of the contents distribution device 3 for receiving the list-presenting request from the terminal device 2 is described referring to the flow chart of FIG. 16. In the contents distribution device 3, it is monitored whether or not the list-presenting request and the device information are received from the terminal device 2 via the internet line 7 (S161) by the detector 21. When the reception of the list-presenting request and the device information is detected in the S161, the data processor 22 transmits the received list-presenting request to the designator 23. The designator 23 designates the information contents that can be materialized in the terminal device 2 transmitting the list-presenting request and the function required for materializing the information contents in the terminal device 2 based on the received list-presenting request and device information. Further, in the designator 23, it is judged whether or not a new program is necessary for realizing the function in the terminal device 2. When the new program is judged to be necessary, the function standard necessary for realizing the function in the terminal device 2 is designated, and the license management device 5 required for the distribution/management of the designated function standard is correspondingly designated. Further, the program distribution device 4 providing the program for realizing the function in the terminal device 2 is designated. In this case, more than one program distribution device 4 and function standard (license management device 5) may be designated. In fact, a plurality of program distribution devices 4 and a plurality of function standards (license management devices 5) are generally designated. In the designator 23, the list of information including the various designation requests described above is generated (S162).

A signal including the list of information generated in the S162 is transmitted from the transmitter 25 to the terminal device 2 via the data processor 22 (S163).

Next, an operation (subsequent stage) of the terminal device 2 after the list-presenting request and the device information are transmitted in the S152 is described referring to FIG. 15.

After the list-presenting request and the device information are transmitted in the S152, it is monitored whether or not the list of information is received in the terminal device 2 by the detector 13 (S153).

In the data processor 14 notified of the reception of the list of information by the detector 13 in the S153, a list of information of the information contents is read from the received list of information. The list of information of the information contents refers to information indicating a list of a singular or a plurality of information contents that can be materialized in the terminal device 2. The read list of information of the information contents is presented in the presenter 16 (display process, sound production process and the like (S154).

After the presentation of the list of the information contents, it is monitored whether or not the user inputs a request for designating the desired information contents to the input unit 10 in the data processor 14 (S155).

The data processor 14, as a result of confirming the input of the information contents designation request in the S155, memorizes the designation request for the designated desired information contents, and further, reads introduction information of the function standards from the received list of information. The introduction information of the function standards refers to information representing a list of function standards required in realizing the function for materializing the designated information contents in the terminal device 2. The respective function standards are necessitated for realizing the function. The introduction information of the function standards having the purpose is read from the list of information.

The presentation process is executed to the read introduction information of the function standards in the presenter 16 (display process, sound production process and the like) (S156). Thereby, the user can select the function standard, based on which the function required for materializing the desired information contents is realized.

After the presentation process is executed to the introduction information of the function standards, it is monitored whether or not the user inputs a request for designating the function standard to the input unit 10 in the data processor 14 (S157).

In the data processor 14, subsequent to the confirmation of the input of the designation request of the function standard in the S157, the designation request for the designated function standard is memorized, and further, introduction information of the program distribution devices 4 is read from the received list of information. The introduction information of the program distribution devices 4 refers to information representing a list of a plurality of program distribution devices 4 for distributing the program required for realizing the desired function in the terminal device 2 based on the designated function standard. The read introduction information of the program distribution devices 4 is subjected to the presentation process in the presenter 16 (display process, sound production process and the like) (S158).

After the execution of the presentation process to the introduction information of the program distribution devices 4, in the data processor 14, it is monitored whether or not the user inputs a request for designating the program distribution device 4 to the input unit 10 (S159).

The data processor 14 detects the input of the designation request for the program distribution device 4 and memorizes the designation request for the designated program distribution device 4. Further, the data processor 14 generates a request for acquiring the information contents based on the memorized designation request for the information contents, designation request for the function standard and designation request for the program distribution device 4, and transmits the generated acquisition request for the information contents and the device information of the terminal device 2 to the contents distribution device 3. The transmission process corresponds to the S72 in FIG. 7, and processes thereafter correspond to the S73 and the following steps in FIG. 7.

Figure 17:
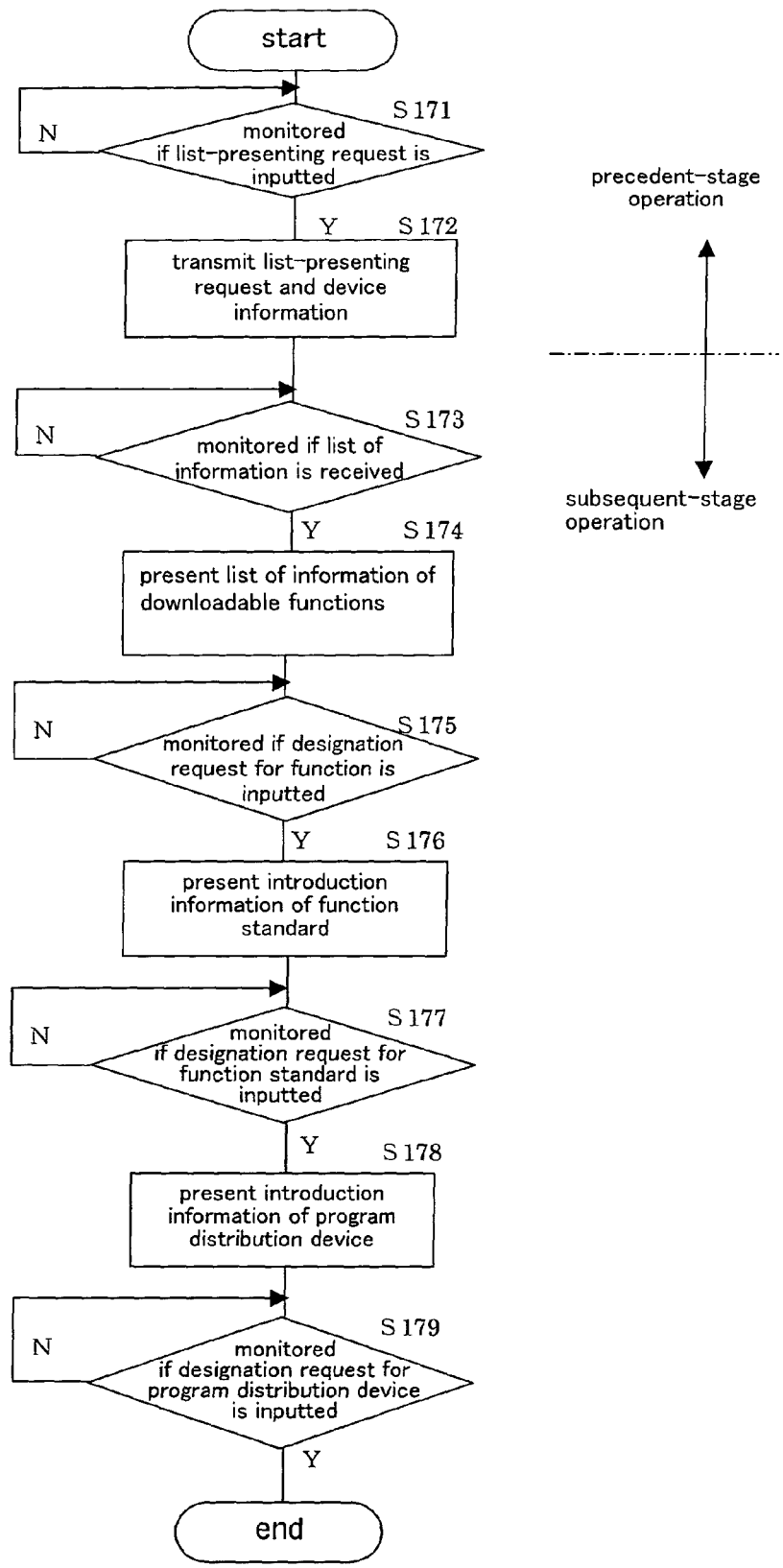
FIG. 17 is a flow chart of a precedent-stage operation of a terminal device according to a second modified example of the embodiment.
Figure 18:
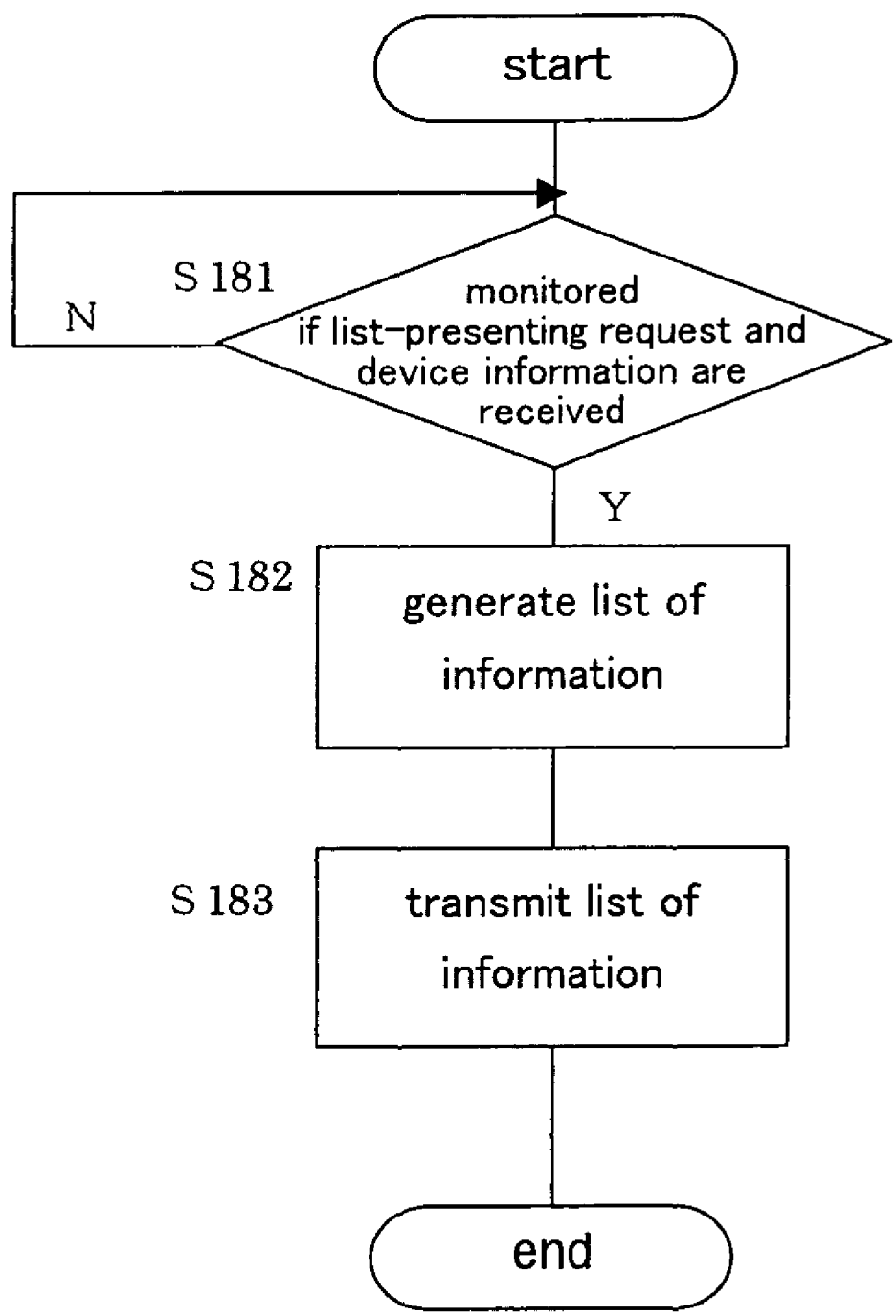
FIG. 18 is a flow chart of a precedent-stage operation of a contents distribution device according to the second modified example of the embodiment.

Next is described a case in which the download system 1 is operated as the function download system under the following conditions is described referring to flow charts of FIGS. 17 and 18.

In the configuration for downloading the function:

There is a plurality of downloadable functions in the terminal device;

There is a plurality of program distribution devices 4, each comprising a program capable of realizing a same function while having a different constitution; and Though one function standard is necessary for realizing a function in the terminal device, a plurality of function standards are capable of realizing one function, and a plurality of license management devices 5 is provided in response to the plurality of function standards.

First, an operation of the terminal device 2 is described referring to the flow chart of FIG. 17. The operation described below is carried out as a process prior to the S111 in the flow chart of FIG. 11 in the same manner as in the flow chart of FIG. 15.

In the terminal device 2, it is monitored whether or not the user of the terminal device 2 inputs a request for presenting a list to the input unit 10 (S171). The request for the list presentation indicates a request for downloading a list of information relating to the functions downloadable in the terminal device 2 from the contents distribution device 3. When the input of the request for the list presentation is confirmed in the S171, a request for presenting the list is generated in the data processor 14. Further, in the data processor 14, the device information of the terminal device 2 is read from the device information storing unit 15 and attached to the list-presenting request. The list-presenting request with the device information is transmitted to the transmitter 11. The transmitter 11 transmits the list-presenting request and the device information transmitted from the data processor 14 to the contents distribution device 3 via the internet line 7 (S172).

So far was described a precedent-stage operation of the terminal device 2 (process relating to the output of the list-presenting request).

Next, an operation of the contents distribution device 3 for receiving the list-presenting request from the terminal device 2 is described referring to the flow chart of FIG. 18. In the contents distribution device 3, it is monitored whether or not the list-presenting request and the device information are received from the terminal device 2 via the internet line 7 (S181) by the detector 21. When the reception of the list-presenting request and the device information is detected in the S181, the data processor 22 transmits the received list-presenting request to the designator 23. The designator 23 designates the function which can be materialized in the terminal device 2 transmitting the list-presenting request based on the received list-presenting request and device information. Further, in the designator 23, the function standard required for realizing each of the designated functions in the terminal device 2 is designated, and the license management device 5 in charge of the distribution/management of the designated function standard is correspondingly designated.

Further, in the designator 23, the program distribution device 4 capable of providing the program for realizing the function in the terminal device 2 is designated. In this case, more than one program distribution device 4 and function standard (license management device 5) may be designated. In fact, a plurality of program distribution devices 4 and a plurality of function standards (license management devices 5) are generally designated. In the designator 23, the list of information including the various designation requests described above is generated (S182).

A signal including the list of information generated in the S182 is transmitted from the transmitter 25 to the terminal device 2 via the data processor 22 (S183).

Next, an operation (subsequent stage) of the terminal device 2 after the list-presenting request and the device information are transmitted in S172 is described referring to FIG. 17.

After the list-presenting request and the device information are transmitted in the S172, it is monitored whether or not the list of information is received in the terminal device 2 by the detector 13 (S173).

In the data processor 14 notified of the reception of the list of information by the detector 13 in the S173, a list of information of the functions is read from the received list of information. The list of information of the functions refers to information indicating a list of a singular or a plurality of functions which can be materialized in the terminal device 2. The read list of information of the functions is subjected to the presentation process in the presenter 16 (display process, sound production process and the like (S174).

After the presentation of the list of the functions, it is monitored whether or not the user inputs a request for designating the desired function to the input unit 10 in the data processor 14 (S175).

The data processor 14, as a result of confirming the input of the function designation request in the S175, memorizes the inputted function designation request, and further, reads introduction information of the function standards from the received list of information. The introduction information of the function standards refers to information representing a list of a plurality of functions standards required for realizing the designated function in the terminal device 2. The respective function standards are necessitated for realizing the function, and the introduction information of the function standards having the purpose is read from the list of information. The read introduction information of the function standards is subjected to the presentation process in the presenter 16 (display process, sound production process and the like) (S176). Thereby, the user can select the function standard, based on which the function required for materializing the desired information contents is realized.

After the introduction information of the function standard is presented, it is monitored whether or not the user inputs a request for designating the function standard to the input unit 10 in the data processor 14 (S177).

In the data processor 14, subsequent to the confirmation of the input of the designation request for the function standard in the S177, the inputted designation request for the function standard is memorized, and further, introduction information of the program distribution devices 4 is read from the received list of information. The introduction information of the program distribution device 4 refers to information representing a list of a plurality of program distribution devices 4 capable of distributing the program required for realizing the desired function in the terminal device 2 based on the designated function standard. The read introduction information of the program distribution devices 4 is subjected to the presentation process in the presenter 16 (display process, sound production process and the like) (S178).

After the execution of the presentation process to the introduction information of the program distribution devices 4, in the data processor 14, it is monitored whether or not the user inputs a request for designating the program distribution device 4 to the input unit 10 (S179). The data processor 14 detects the input of the designation request for the program distribution device 4 and memorizes the inputted designation request for the program distribution device 4. Further, the data processor 14 generates a request for acquiring the function based on the memorized designation request for the function, designation request for the function standard and designation request for the program distribution device 4, and transmits the generated function acquisition request and the device information of the terminal device 2 to the contents distribution device 3. The transmission process corresponds to the S112 in FIG. 11, and processes thereafter correspond to the S113 and the following steps in FIG. 11.

Figure 20:
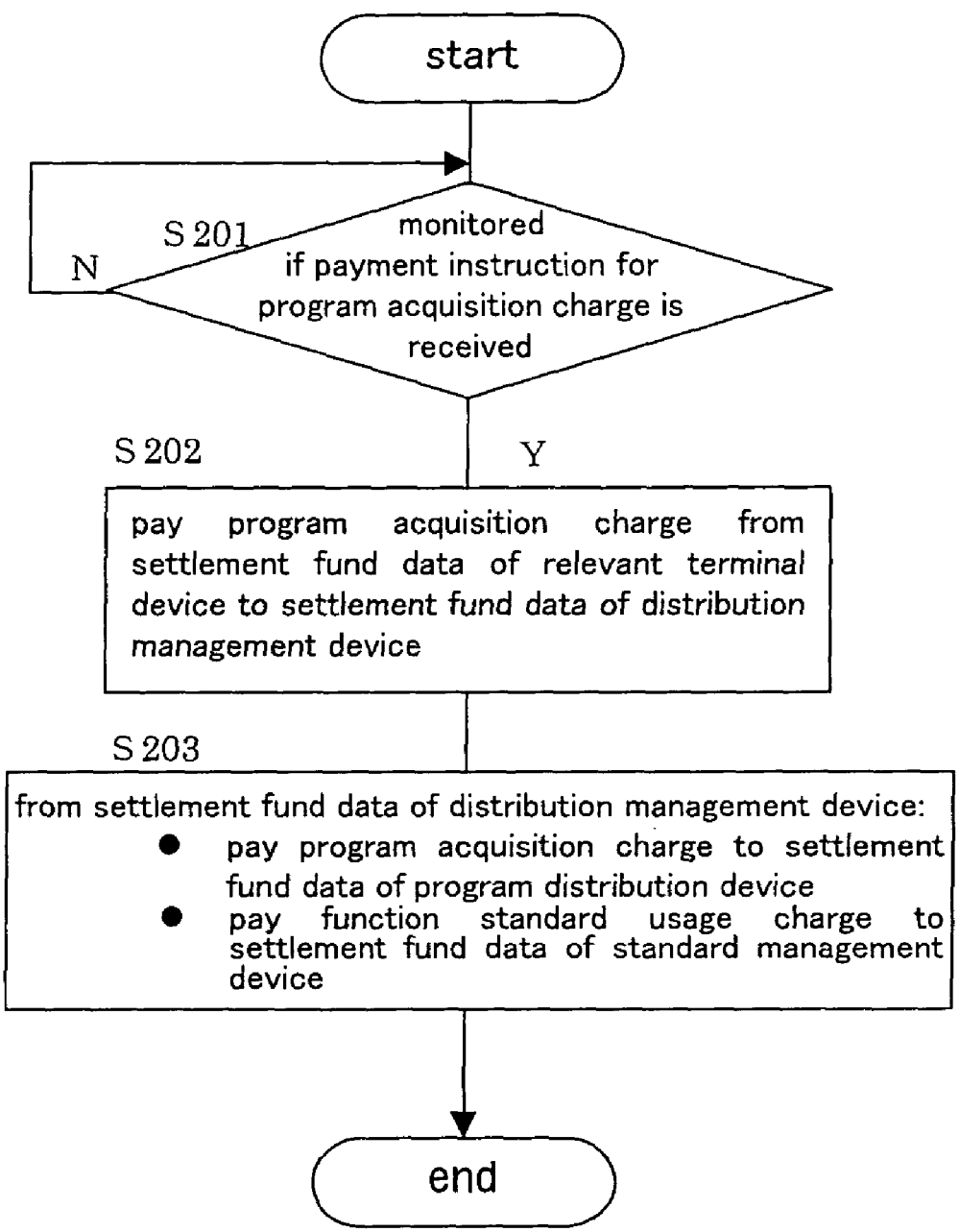
FIG. 20 is a flow chart of an operation of the settlement management device in the case of operating the download system as the function download system.

Next, a charging system and a method of implementing the system in the download system 1 are described referring to the block diagram of the device constitution of FIG. 6 and flow charts of FIGS. 19 and 20. First, the charging system and its processes in the case of the transmission/reception of the information contents in the download system 1 are described. In FIG. 6, black arrows show a flow of instruction information, while white arrows show a flow of money data.

The terminal device 2 transmits an instruction for paying a contents acquisition charge to the settlement management device 6 in response to the acquisition of the information contents from the contents distribution device 3. When the payment instruction is transmitted, ID information of the terminal device 2 is preferably set in advance between the terminal device 2 and the settlement management device 6 so that the ID information is memorized in the terminal device 2 and the settlement management device 6. Thereby, the settlement management device 6 can identify the terminal device 2 which transmitted the payment instruction by attaching the ID information to the payment instruction transmitted from the terminal device 2. In this manner, it can be inhibited that any false terminal device 2 transmits the payment instruction.

In the settlement management device 6, it is monitored whether or not the payment instruction is received from the terminal device 2 (S191) by the data processor 51.

The data processor 51 confirms the reception of the payment instruction from the terminal device 2 in the S191, and outputs the payment instruction for the contents acquisition charge to the terminal device fund data storing unit 52. The terminal device fund data storing unit 52 receives the payment instruction for the contents acquisition charge and executes a data process for retrieving the contents acquisition charge from settlement fund data of the terminal device 2 stored therein. More specifically, the data process for subtracting money data corresponding to the contents acquisition charge from the settlement fund data is executed.

The data processor 51 confirms the execution of the data process for retrieving the contents acquisition charge in the terminal device fund data storing unit 52 and outputs an instruction for receiving the contents acquisition charge to the contents distribution device fund data storing unit 53. The contents distribution device fund data storing unit 53 receives the receipt instruction for the contents acquisition charge and executes a data process for receiving the contents acquisition charge to settlement fund data of the contents distribution device 3 stored therein. More specifically, the data process for adding the money data corresponding to the contents acquisition charge to the settlement fund data is executed (S192).

The data processor 51 confirms the execution of the data process for receiving the contents acquisition charge in the contents distribution device fund data storing unit 53 and judges whether or not the current transfer of the information contents accompanies the transfer of the function program (S193) The judgment is made by, for example, analyzing the payment instruction received from the terminal device 2.

The data processor 51 terminates a sequence of payment processes when judging that the transfer of the function program is not additionally generated.

On the contrary, when it is judged that the transfer of the function program is additionally generated in the S193, in the data processor 51, an instruction for paying a program acquisition charge and an instruction for paying a function standard usage charge are outputted to the contents distribution device fund data storing unit 53. The contents distribution device fund data storing unit 53 receives these instructions and executes data processes for retrieving the program acquisition charge and the function standard usage charge from the stored settlement fund data of the contents distribution device 3. More specifically, the data process for subtracting money data corresponding to the program acquisition charge from the stored settlement fund data of the contents distribution device 3 and the data process for subtracting money data corresponding to the function standard usage charge therefrom are executed.

The data processor 51 confirms the execution of the data processes for retrieving the program acquisition charge and the function standard usage charge in the contents distribution device fund data storing unit 53, and outputs an instruction for receiving the program acquisition charge to the program distribution device fund data storing unit 54 and outputs an instruction for receiving the function standard usage charge to the license management device fund data storing unit 55.

The program distribution device fund data storing unit 54 receives the receipt instruction for the program acquisition charge and executes a data process for receiving the program acquisition charge to settlement fund data of the program distribution device 4 stored therein. More specifically, the data process for adding the money data corresponding to the program acquisition charge to the settlement fund data is executed.

The license management device fund data storing unit 55 receives the instruction for receiving the function standard usage charge and executes a data process for receiving the function standard usage charge to settlement fund data of the license management device 5 stored therein. More specifically, the data process for adding the money data corresponding to the function standard usage charge to the settlement fund data is executed (S194). Then, a sequence of payment processes is terminated.

Next, a charging system and its processes in the case of the transmission/reception of the function program in the download system 1 are described referring to a flow chart of FIG. 20. In this case, the contents distribution device fund data storing unit 53 functions as a fund data storing unit of the distribution management device.

The terminal device 2 transmits the instruction for paying the program acquisition charge to the settlement management device 6 in response to the acquisition of the program from the program distribution device 4. In the settlement management device 6, it is monitored whether or not the payment instruction is received from the terminal device 2 (S201) by the data processor 51.

The data processor 51 confirms the reception of the instruction payment from the terminal device 2 in the S201, and outputs an instruction for paying the program acquisition charge to the terminal device fund data storing unit 52. The terminal device fund data storing unit 52 receives the payment instruction for the program acquisition charge and executes a data process for retrieving the program acquisition charge from the settlement fund data of the terminal device 2 stored therein. More specifically, the data process for subtracting money data corresponding to the program acquisition charge from the settlement fund data is executed.

The data processor 51 confirms the execution of the data process for retrieving the program acquisition charge in the terminal device fund data storing unit 52 and outputs an instruction for receiving the program acquisition charge to the contents distribution device fund data storing unit (functioning as distribution management device fund data storing unit) 53. The contents distribution device fund data storing unit 53 receives the receipt instruction for the program acquisition charge and executes a data process for receiving the program acquisition charge to the settlement fund data of the contents distribution device 3 stored therein. More specifically, the data process for adding the money data corresponding to the program acquisition charge to the settlement fund data is executed (S202).

The data processor 51 confirms the execution of the data process for receiving the program acquisition charge in the contents distribution device fund data storing unit 53 and outputs an instruction for paying the program acquisition charge and an instruction for paying the function standard usage charge to the contents distribution device fund data storing unit 53. The contents distribution device fund data storing unit 53 receives these payment instructions and executes data processes for retrieving the program acquisition charge and the function standard usage charge from the stored settlement fund data of the contents distribution device (functioning as distribution management device) 3. More specifically, the data process for subtracting the money data corresponding to the program acquisition charge from the settlement fund data and the data process for subtracting the money data corresponding to the function standard usage charge from the settlement fund data are executed.

The data processor 51 confirms the execution of the data processes for retrieving the program acquisition charge and the function standard charge in the contents distribution device fund data storing unit 53, and outputs an instruction for receiving the program acquisition charge to the program distribution device fund data storing unit 54 and an instruction for receiving the function standard usage charge to the license management device fund data storing unit 55.

The program distribution device fund data storing unit 54 receives the receipt instruction for the program acquisition charge and executes a data process for receiving the program acquisition charge to the stored settlement fund data of the program distribution device 4. More specifically, the data process for adding the money data corresponding to the program acquisition charge to the settlement fund data is executed.

The license management device fund data storing unit 55 receives the instruction for receiving the function standard usage charge and executes a data process for receiving the function standard usage charge to the stored settlement fund data of the license management device 5. More specifically, the data process for adding the money data corresponding to the function standard usage charge to the settlement fund data is executed (S203). A sequence of payment processes is then terminated.

In the contents distribution device 3, transactions relating to the program distribution/management and transactions relating to the program distribution/management are generated. Handling charges generated from these transactions may be collected from the program distribution device 4 and the license management device 5. When such handling charges are collected, a process for the payment of money data corresponding to the handling charges from the program distribution device fund data storing unit 54 and the license management device fund data storing unit 55 to the contents distribution device fund data storing unit 53 is preferably executed on a regular basis (monthly, annually or the like).

Further, in the system in which a plurality of program distribution devices 4 and license management devices 5 are provided, and one or more are optionally selected from the plurality of devices 4 and 5 on the terminal-device-2 side, information for introducing the plurality of devices 4 and 5 is distributed from the contents distribution device 3 to the terminal device 2. In such a case, in the distribution of the information for introducing the devices 4 and 5, the contents distribution device 3 is actually taking care of advertising transactions on behalf of the devices 4 and 5. Therefore, handling charges for the generated advertising transactions may be collected from the program distribution device 4 and the license management device 5. In such a case, in the same manner as in the before-mentioned handling charges, a process for the payment of money data corresponding to the handling charges from the program distribution device fund data storing unit 54 and the license management device fund data storing unit 55 to the contents distribution device fund data storing unit 53 is preferably executed on a regular basis (monthly, annually or the like).

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An information contents download system comprising:
   a terminal device comprising a hardware configuration capable of materializing optional information contents by adding a predetermined function thereto;
   a contents distribution device configured to distribute the information contents;
   a program distribution device configured to distribute a program for realizing the function used for the materialization in the terminal device of the information contents in the terminal device; and
   a license management device configured to manage a license for using a function standard required for realizing the function in the terminal device, the respective devices being connected to one another to enable an intercommunication via an electric communication line, wherein:
   the terminal device is configured to transmit device information of the terminal device, the device information including information representing at least the hardware configuration of the terminal device, and a request for acquiring information contents desired by a user of the terminal device identified based on an instruction input operation implemented to the terminal device by the user of the terminal device to the contents distribution device, and to receive the information contents desired by the user from the contents distribution device and the program required for the materialization of the desired information contents is received from the program distribution device, the terminal device is further configured to materialize the information contents by means of the function acquired in execution of the received program, the contents distribution device is configured to judge whether or not a new program for realizing the function for materializing the information contents in the terminal device transmitting the acquisition request is necessary based on the information contents requested in the acquisition request received from the terminal device and the device information attached to the acquisition request, and to transmit the information contents requested in the received acquisition request to the terminal device when the new program is judged to be unnecessary, the contents distribution device is further configured to designate the new program when the program is judged to be necessary, and to transmit a request for distributing the designated program to the program distribution device and to transmit a license request for using the function standard required for realizing the function in the terminal device to the license management device, the license management device is configured to transmit an authorization for using the function standard required for realizing the function in the terminal device to the program distribution device and the contents distribution device in response to the reception of the usage license request, the program distribution device is configured to transmit the program designated in the distribution request to the terminal device only when the usage authorization is received from the license management device, and the contents distribution device is configured to transmit the information contents indicated in the received acquisition request to the terminal device in the case of necessitating the new program in the terminal device only when the usage authorization is received from the license management device.

2. The information contents download system as claimed in claim 1, wherein the terminal device comprises:

an input device configured to receive an instruction input operation implemented to the terminal device by the user of the terminal device;

a transmitter configured to transmit signals including the acquisition request for the information contents desired by the user of the terminal device identified based on the instruction input operation implemented to the input device by the user and device information of the terminal device to the contents distribution device;

a receiver configured to receive a signal including the information contents desired by the user from the contents distribution device and receiving a signal including the program required for materializing the desired information contents from the program distribution device; and an executor configured to materialize the information contents by means of the function obtained in execution of the program, the contents distribution device comprises:

a receiver configured to receive the signals including the acquisition request and the device information of the terminal device from the terminal device;

a designator configured to judge whether or not the new program is necessary for realizing the function for materializing the information contents in the terminal device transmitting the acquisition request based on the information contents requested in the received acquisition request and the device information attached to the acquisition request, the designator designating the new program when the new program is necessary;

a contents storing device configured to store the information contents; and a transmitter configured to read the information contents request in the received acquisition request from the contents storing device and transmitting the signal including the information contents to the terminal device, the transmitter further transmitting a signal including the distribution request for the program designated in the designator to the program distribution device and transmitting a signal including the usage license request for the function standard required for realizing the function in the terminal device transmitting the acquisition request to the license management device, the program distribution device comprises:

a receiver configured to receive the signal including the distribution request from the contents distribution device and the signal including the usage license request from the license management device;

a program storing device configured to store the program; and a transmitter configured to read the program designated in the received distribution request from the program storing device and transmitting the signal including the program to the terminal device only when the usage authorization is received, the license management device comprises:

a receiver configured to receive the signal including the usage license request from the contents distribution device; and a transmitter configured to transmit a signal including the usage authorization with respect to the terminal device designated in the usage license request to the program distribution device and the contents distribution device, and the transmitter of the contents distribution device is configured to transmit the signal including the information contents designated in the acquisition request when the new program is not necessary in the terminal device, to read the information contents requested in the received acquisition request from the contents storing device, and to transmit the signal including the information contents to the terminal device in the case of necessitating the new program in the terminal device in the case of necessitating the new program in the terminal device only when the usage authorization is received from the license management device.

3. The information contents download system as claimed in claim 2, wherein the transmitter of the terminal device is configured to transmit a signal including a request for presenting a list of the information contents inputted to the input device by the user to the contents distribution device, the designator of the contents distribution device is configured to generate a list of information of the information contents that can be materialized in the terminal device based on the list-presenting request and the device information received from the terminal device, the transmitter of the contents distribution device is configured to transmit a signal including the list of information generated in the designator to the terminal device, and the terminal device further comprises a presenter for presenting the list of information received from the contents distribution device to the user, and the input device of the terminal device is configured to confirm contents of the acquisition request based on acknowledgment of the instruction input operation implemented to the input device by the user referring to the list of information presented in the presenter.

4. The information contents download system as claimed in claim 3, wherein a plurality of function standards is provided,
- a plurality of license management devices is provided in response to the plurality of function standards,
- the designator of the contents distribution device is configured to generate the list of information including introduction information of the plurality of function standards,
- the transmitter of the terminal device is configured to designate the function standard and generate the acquisition request including a designation request for the designated function standard based on acknowledgement of the instruction input operation implemented to the input device by the user referring to the list of information presented in the presenter,
- the designator of the contents distribution device is configured to designate the license management device based on the designation request for the function standard included in the acquisition request, and
- the transmitter of the contents distribution device is configured to transmit the signal including the usage license request to the license management device designated in the designator.

5. The information contents download system as claimed in claim 3, wherein a plurality of program distribution devices is provided,
- the designator of the contents distribution device is configured to generate the list of information including introduction information of the plurality of program distribution devices,
- the transmitter of the terminal device is configured to generate the acquisition request including a request for designating the program distribution device based on acknowledgement of the instruction input operation implemented to the input device by the user referring to the list of information presented in the presenter,
- the designator of the contents distribution device is configured to designate the program distribution device based on the designation request for the program distribution device included in the acquisition request, and
- the transmitter of the contents distribution device is configured to transmit a signal including the device information of the terminal device transmitting the acquisition request to the program distribution device designated in the designator.

6. An information contents download method, the method being performed with an information contents download system including: a terminal device comprising a hardware configuration capable of materializing optional information contents by adding a predetermined function thereto; a contents distribution device configured to distribute the information contents; a program distribution device configured to distribute a program for realizing the function used for the materialization in the terminal device of the information contents in the terminal device; and a license management device configured to manage a license for using a function standard required for realizing the function in the terminal device, the respective devices being connected to one another to enable an intercommunication via an electric communication line, the information contents download method comprising steps of:
- transmitting, by the terminal device, device information of the terminal device, the device information including information representing at least the hardware configuration of the terminal device, and a request for acquiring information contents desired by a user of the terminal device identified based on an instruction input operation implemented to the terminal device by the user of the terminal device to the contents distribution device, and receiving, by the terminal device, the information contents desired by the user from the contents distribution device and the program required for the materialization of the desired information contents is received from the program distribution device,
- materializing, by the terminal device, the information contents by means of the function acquired in execution of the received program,
- judging, by the contents distribution device, whether or not a new program for realizing the function for materializing the information contents in the terminal device transmitting the acquisition request is necessary based on the information contents requested in the acquisition request received from the terminal device and the device information attached to the acquisition request, and transmitting, by the contents distribution device, the information contents requested in the received acquisition request to the terminal device when the new program is judged to be unnecessary,
- designating, by the contents distribution device, the new program when the program is judged to be necessary, transmitting, by the contents distribution device, a request for distributing the designated program to the program distribution device and transmitting, by the contents distribution device, a license request for using the function standard required for realizing the function in the terminal device to the license management device,
- transmitting, by the license management device, an authorization for using the function standard required for realizing the function in the terminal device to the program distribution device and the contents distribution device in response to the reception of the usage license request, transmitting, by the program distribution device, the program designated in the distribution request to the terminal device only when the usage authorization is received from the license management device, and
- transmitting, by the contents distribution device, the information contents indicated in the received acquisition request to the terminal device in the case of necessitating the new program in the terminal device only when the usage authorization is received from the license management device.

7. The information contents download method as claimed in claim 6, wherein the terminal device comprises:
- an input device configured to receive an instruction input operation implemented to the terminal device by the user of the terminal device;
- a transmitter configured to transmit signals including the acquisition request for the information contents desired by the user of the terminal device identified based on the instruction input operation implemented to the input device by the user and device information of the terminal device to the contents distribution device;
- a receiver configured to receive a signal including the information contents desired by the user from the contents distribution device and receiving a signal including the program required for materializing the desired information contents from the program distribution device; and
- an executor configured to materialize the information contents by means of the function obtained in execution of the program, the contents distribution device comprises:

a receiver configured to receive the signals including the acquisition request and the device information of the terminal device from the terminal device;

a designator configured to judge whether or not the new program is necessary for realizing the function for materializing the information contents in the terminal device transmitting the acquisition request based on the information contents requested in the received acquisition request and the device information attached to the acquisition request, the designator designating the new program when the new program is necessary;

a contents storing device configured to store the information contents; and a transmitter configured to read the information contents request in the received acquisition request from the contents storing device and transmitting the signal including the information contents to the terminal device, the transmitter further transmitting a signal including the distribution request for the program designated in the designator to the program distribution device and transmitting a signal including the usage license request for the function standard required for realizing the function in the terminal device transmitting the acquisition request to the license management device, the program distribution device comprises:

a receiver configured to receive the signal including the distribution request from the contents distribution device and the signal including the usage license request from the license management device;

a program storing device configured to store the program; and a transmitter configured to read the program designated in the received distribution request from the program storing device and transmitting the signal including the program to the terminal device only when the usage authorization is received, the license management device comprises:

a receiver configured to receive the signal including the usage license request from the contents distribution device; and a transmitter configured to transmit a signal including the usage authorization with respect to the terminal device designated in the usage license request to the program distribution device and the contents distribution device, and the method further comprises:

transmitting, by the transmitter of the contents distribution device, the signal including the information contents designated in the acquisition request when the new program is not necessary in the terminal device;

reading, by the transmitter of the contents distribution device, the information contents requested in the received acquisition request from the contents storing device; and transmitting, by the transmitter of the contents distribution device, the signal including the information contents to the terminal device in the case of necessitating the new program in the terminal device in the case of necessitating the new program in the terminal device only when the usage authorization is received from the license management device.

8. The information contents download system as claimed in claim 7, further comprising:

transmitting, by the transmitter of the terminal device, a signal including a request for presenting a list of the information contents inputted to the input device by the user to the contents distribution device, generating, by the designator of the contents distribution device, a list of information of the information contents that can be materialized in the terminal device based on the list-presenting request and the device information received from the terminal device, transmitting, by the transmitter of the contents distribution device, a signal including the list of information generated in the designator to the terminal device, wherein the terminal device further comprises a presenter for presenting the list of information received from the contents distribution device to the user, and the method further includes the step of confirming, by the input device of the terminal device, contents of the acquisition request based on acknowledgment of the instruction input operation implemented to the input device by the user referring to the list of information presented in the presenter.

9. The information contents download method as claimed in claim 8, wherein: a plurality of function standards is provided, a plurality of license management devices is provided in response to the plurality of function standards, and the method further comprises:

generating, by the designator of the contents distribution device, the list of information including introduction information of the plurality of function standards;

designating, by the transmitter of the terminal device, the function standard and generating, by the transmitter of the terminal device, the acquisition request including a designation request for the designated function standard based on acknowledgement of the instruction input operation implemented to the input device by the user referring to the list of information presented in the presenter;

designating, by the designator of the contents distribution device, the license management device based on the designation request for the function standard included in the acquisition request; and transmitting, by the transmitter of the contents distribution device, the signal including the usage license request to the license management device designated in the designator.

10. The information contents download method as claimed in claim 8, wherein a plurality of program distribution devices is provided, and the method further comprises:

generating, by the designator of the contents distribution device, the list of information including introduction information of the plurality of program distribution devices;

generating, by the transmitter of the terminal device, the acquisition request including a request for designating the program distribution device based on acknowledgement of the instruction input operation implemented to the input device by the user referring to the list of information presented in the presenter;

designating, by the designator of the contents distribution device, the program distribution device based on the designation request for the program distribution device included in the acquisition request; and transmitting, by the transmitter of the contents distribution device, a signal including the device information of the terminal device transmitting the acquisition request to the program distribution device designated in the designator.

* * * * *